United States Patent
Ryu et al.

(10) Patent No.: US 6,997,216 B2
(45) Date of Patent: Feb. 14, 2006

(54) LIQUID CRYSTAL DISPENSING SYSTEM

(75) Inventors: Joung-Ho Ryu, Seoul (KR); Soo-Min Kwak, Gyeongsangbuk-Do (KR); Hae-Joon Son, Busan (KR); Man-Ho An, Gyeongsangbuk-Do (KR); Joon-Young Kim, Gyeongsangbuk-Do (KR)

(73) Assignees: LG. Philips LCD Co., Ltd., Seoul (KR); Top Engineering Co., Ltd., Gyeongsangbuk-Do (KR)

( * ) Notice: Subject to any disclaimer, the term of this patent is extended or adjusted under 35 U.S.C. 154(b) by 0 days.

(21) Appl. No.: 10/875,558

(22) Filed: Jun. 25, 2004

(65) Prior Publication Data

US 2004/0261894 A1 Dec. 30, 2004

(30) Foreign Application Priority Data

Jun. 27, 2003 (KR) ................. 10-2003-0042831

(51) Int. Cl.
*B65B 1/04* (2006.01)

(52) U.S. Cl. ................. 141/67; 141/98; 349/189
(58) Field of Classification Search ........... 141/67, 141/4, 7, 98; 349/187–189; 222/390
See application file for complete search history.

(56) References Cited

U.S. PATENT DOCUMENTS

| | | | |
|---|---|---|---|
| 3,978,580 | A | 9/1976 | Leupp et al. |
| 4,094,058 | A | 6/1978 | Yasutake et al. |
| 4,653,864 | A | 3/1987 | Baron et al. |

(Continued)

FOREIGN PATENT DOCUMENTS

| | | |
|---|---|---|
| EP | 1 003 066 | 5/2000 |
| JP | 51-065656 | 6/1976 |
| JP | 57-038414 | 3/1982 |

(Continued)

*Primary Examiner*—Steven O. Douglas
(74) *Attorney, Agent, or Firm*—McKenna Long & Aldridge LLP

(57) ABSTRACT

A liquid crystal dispensing system includes a container for containing liquid crystal; a liquid crystal measuring sensor proximate the container; a discharge pump for pumping liquid crystal from the container, and a nozzle for dispensing liquid crystal discharged from the discharge pump onto a substrate. In an exemplary embodiment, the crystal dispensing system includes a control unit for controlling a discharge amount of liquid crystal discharged from the discharge pump and calculating and compensating a dispensing amount of liquid crystal based on an amount of measured liquid crystal in the container.

74 Claims, 13 Drawing Sheets

U.S. PATENT DOCUMENTS

| | | | |
|---|---|---|---|
| 4,691,995 A | 9/1987 | Yamazaki et al. | |
| 4,775,225 A | 10/1988 | Tsuboyama et al. | |
| 5,247,377 A | 9/1993 | Omeis et al. | |
| 5,263,888 A | 11/1993 | Ishihara et al. | |
| 5,379,139 A | 1/1995 | Sato et al. | |
| 5,406,989 A | 4/1995 | Abe | |
| 5,499,128 A | 3/1996 | Hasegawa et al. | |
| 5,507,323 A * | 4/1996 | Abe | 141/31 |
| 5,511,591 A | 4/1996 | Abe | |
| 5,539,545 A | 7/1996 | Shimizu et al. | |
| 5,548,429 A | 8/1996 | Tsujita | |
| 5,642,214 A | 6/1997 | Ishii et al. | |
| 5,680,189 A | 10/1997 | Shimizu et al. | |
| 5,742,370 A | 4/1998 | Kim et al. | |
| 5,757,451 A | 5/1998 | Miyazaki et al. | |
| 5,852,484 A | 12/1998 | Inoue et al. | |
| 5,854,664 A | 12/1998 | Inoue et al. | |
| 5,861,932 A | 1/1999 | Inata et al. | |
| 5,875,922 A | 3/1999 | Chastine et al. | |
| 5,952,676 A | 9/1999 | Sato et al. | |
| 5,956,112 A | 9/1999 | Fujimori et al. | |
| 6,001,203 A | 12/1999 | Yamada et al. | |
| 6,011,609 A | 1/2000 | Kato et al. | |
| 6,016,178 A | 1/2000 | Kataoka et al. | |
| 6,016,181 A | 1/2000 | Shimada | |
| 6,055,035 A | 4/2000 | von Gutfeld et al. | |
| 6,163,357 A | 12/2000 | Nakamura | |
| 6,219,126 B1 | 4/2001 | Von Gutfeld | |
| 6,226,067 B1 | 5/2001 | Nishiguchi et al. | |
| 6,236,445 B1 | 5/2001 | Foschaar et al. | |
| 6,304,306 B1 | 10/2001 | Shiomi et al. | |
| 6,304,311 B1 | 10/2001 | Egami et al. | |
| 6,337,730 B1 | 1/2002 | Ozaki et al. | |
| 6,414,733 B1 | 7/2002 | Ishikawa et al. | |
| 6,782,928 B2 * | 8/2004 | Kweon et al. | 141/192 |
| 6,805,308 B2 * | 10/2004 | Kweon et al. | 239/583 |
| 2001/0021000 A1 | 9/2001 | Egami | |
| 2004/0011422 A1 | 1/2004 | Ryu et al. | |

FOREIGN PATENT DOCUMENTS

| | | |
|---|---|---|
| JP | 57-088428 | 6/1982 |
| JP | 58-027126 | 2/1983 |
| JP | 59-057221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-007822 | 1/1986 |
| JP | 61-055625 | 3/1986 |
| JP | 62-089025 | 4/1987 |
| JP | 62-090622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | 05-127179 | 5/1993 |
| JP | 05-154923 | 6/1993 |
| JP | 05-265011 | 10/1993 |
| JP | 05-281557 | 10/1993 |
| JP | 05-281562 | 10/1993 |
| JP | 06-051256 | 2/1994 |
| JP | 06-148657 | 5/1994 |
| JP | 06-160871 | 6/1994 |
| JP | 06-235925 | 8/1994 |
| JP | 06-265915 | 9/1994 |
| JP | 06-313870 | 11/1994 |
| JP | 07/084268 | 3/1995 |
| JP | 07-128674 | 5/1995 |
| JP | 07-181507 | 7/1995 |
| JP | 08-095066 | 4/1996 |
| JP | 08-101395 | 4/1996 |
| JP | 08-106101 | 4/1996 |
| JP | 08-171094 | 7/1996 |
| JP | 08-190099 | 7/1996 |
| JP | 08-240807 | 9/1996 |
| JP | 09-005762 | 1/1997 |
| JP | 09-026578 | 1/1997 |
| JP | 09-061829 | 3/1997 |
| JP | 09-073075 | 3/1997 |
| JP | 09-073096 | 3/1997 |
| JP | 09-127528 | 5/1997 |
| JP | 09-230357 | 9/1997 |
| JP | 09-281511 | 10/1997 |
| JP | 09-311340 | 12/1997 |
| JP | 10-123537 | 5/1998 |
| JP | 10-123538 | 5/1998 |
| JP | 10-142616 | 5/1998 |
| JP | 10-177178 | 6/1998 |
| JP | 10-221700 | 8/1998 |
| JP | 10-282512 | 10/1998 |
| JP | 10-333157 | 12/1998 |
| JP | 10-333159 | 12/1998 |
| JP | 11-014953 | 1/1999 |
| JP | 11-038424 | 2/1999 |
| JP | 11-064811 | 3/1999 |
| JP | 11-109388 | 4/1999 |
| JP | 11-133438 | 5/1999 |
| JP | 11-142864 | 5/1999 |
| JP | 11-174477 | 7/1999 |
| JP | 11-212045 | 8/1999 |
| JP | 11-248930 | 9/1999 |
| JP | 11-326922 | 11/1999 |
| JP | 11-344714 | 12/1999 |
| JP | 2000-002879 | 1/2000 |
| JP | 2000-029035 | 1/2000 |
| JP | 2000-056311 | 2/2000 |
| JP | 2000-066165 | 3/2000 |
| JP | 2000-137235 | 5/2000 |
| JP | 2000-147528 | 5/2000 |
| JP | 2000-193988 | 7/2000 |
| JP | 2000-241824 | 9/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2000-338501 | 12/2000 |
| JP | 2001-005401 | 1/2001 |
| JP | 2001-005405 | 1/2001 |
| JP | 2001-013506 | 1/2001 |
| JP | 2001-033793 | 2/2001 |
| JP | 2001-042341 | 2/2001 |
| JP | 2001-051284 | 2/2001 |
| JP | 2001-066615 | 3/2001 |
| JP | 2001-091727 | 4/2001 |
| JP | 2001-117105 | 4/2001 |
| JP | 2001-117109 | 4/2001 |
| JP | 2001-133745 | 5/2001 |
| JP | 2001-133794 | 5/2001 |
| JP | 2001-133799 | 5/2001 |
| JP | 2001-142074 | 5/2001 |
| JP | 2001-147437 | 5/2001 |
| JP | 2001-154211 | 6/2001 |
| JP | 2001-166272 | 6/2001 |
| JP | 2001-166310 | 6/2001 |
| JP | 2001-183683 | 7/2001 |
| JP | 2001-201750 | 7/2001 |
| JP | 2001-209052 | 8/2001 |
| JP | 2001-209060 | 8/2001 |
| JP | 2001-215459 | 8/2001 |

| | | |
|---|---|---|
| JP | 2001-222017 | 8/2001 |
| JP | 2001-235758 | 8/2001 |
| JP | 2001-255542 | 9/2001 |
| JP | 2001-264782 | 9/2001 |
| JP | 2001-272640 | 10/2001 |
| JP | 2001-281675 | 10/2001 |
| JP | 2001-281678 | 10/2001 |
| JP | 2001-282126 | 10/2001 |
| JP | 2001-305563 | 10/2001 |
| JP | 2001-330837 | 11/2001 |
| JP | 2001-330840 | 11/2001 |
| JP | 2001-356353 | 12/2001 |
| JP | 2001-356354 | 12/2001 |
| JP | 2002-014360 | 1/2002 |
| JP | 2002-023176 | 1/2002 |
| JP | 2002-049045 | 2/2002 |
| JP | 2002-082340 | 3/2002 |
| JP | 2002-090759 | 3/2002 |
| JP | 2002-090760 | 3/2002 |
| JP | 2002-107740 | 4/2002 |
| JP | 2002-122872 | 4/2002 |
| JP | 2002-122873 | 4/2002 |
| JP | 2002-139734 | 5/2002 |
| JP | 2002-202512 | 7/2002 |
| JP | 2002-202514 | 7/2002 |
| JP | 2002-214626 | 7/2002 |
| KR | 2000-0035302 | 6/2000 |

\* cited by examiner

LIQUID CRYSTAL DISPENSING SYSTEM

The present application claims the benefit of Korean Patent Application No.2003-42831 filed in Korea on Jun. 27, 2003. The present application also incorporates by reference U.S. patent application Ser. No. 10/421,714, which has published as U.S. Patent Publication No. 2004-0011422-A1, and U.S. patent application Ser. No. 10/840,415, filed May 7, 2004.

BACKGROUND OF THE INVENTION

1. Field of the Invention

The present invention relates to equipment for manufacturing a liquid crystal display device, and more particularly, to a liquid crystal dispensing system.

2. Description of the Related Art

Recently, various portable electric devices, such as mobile phones, personal digital assistant (PDA), and note book computers have been developed, because of their small size, light weight, and power-efficient operations. Accordingly, flat panel display devices, such as liquid crystal displays (LCDs), plasma display panels (PDPs), field emission displays (FEDs), and vacuum fluorescent displays (VFDs), have been developed. Of these flat panel display devices, the LCDs are currently mass produced because of their simple driving scheme and superior image quality.

FIG. 1 is a cross sectional view of an LCD device according to the related art. In FIG. 1, an LCD device 1 comprises a lower substrate 5, an upper substrate 3, and a liquid crystal layer 7 formed therebetween. The lower substrate 5 is a driving device array substrate, and includes a plurality of pixels (not shown) and a driving device, such as a thin film transistor (TFT), formed on each pixel. The upper substrate 3 is a color filter substrate, and includes a color filter layer for reproducing real color. In addition, a pixel electrode and a common electrode are formed on the lower substrate 5 and the upper substrate 3, respectively. An alignment layer is formed on both the lower and upper substrates 5 and 3 to align liquid crystal molecules of the liquid crystal layer 7. The lower substrate 5 and the upper substrate 3 are attached along a perimeter by a sealant 9, and the liquid crystal 7 is confined within the perimeter. In operation, the liquid crystal molecules of the liquid crystal layer 7 are reoriented by the driving device formed on the lower substrate 5 to control amounts of light transmitted through the liquid crystal layer 7, thereby displaying an image.

FIG. 2 is a flow chart of a fabrication method for an LCD device according to the related art. In FIG. 2, a fabrication method includes three sub-processes for manufacturing an LCD device: a driving device array substrate process for forming the driving device on the lower substrate 5; a color filter substrate process for forming the color filter on the upper substrate 3; and a cell process.

In Step S101, a plurality of gate lines and data lines are formed on the lower substrate 5 to define a pixel area by the driving device array process, and the thin film transistor connected to both the gate line and the data line is formed on the each pixel area. In addition, a pixel electrode, which is to be connected to the thin film transistor to drive the liquid crystal layer according to a signal applied through the thin film transistor, is formed by the driving device array process. In Step S104, R, G, and B color filter layers for reproducing the color and a common electrode are formed on the upper substrate 3 by the color filter process.

In Steps S102 and S105, alignment layers are formed on the lower substrate 5 and the upper substrate 3. Then, the alignment layers are individually rubbed to induce surface anchoring (i.e. a pretilt angle and alignment direction) for the liquid crystal molecules of the liquid crystal layer 7. In Step S103, a spacer is dispersed onto the lower substrate 5 for maintaining a uniform cell gap between the lower and upper substrates 5 and 3. In Step S106, a sealant is printed along outer portions of the upper substrate 3.

In Step S107, the lower and upper substrates 5 and 3 are assembled together by compression. The lower substrate 5 and the upper substrate 3 are both formed of glass substrates, and include a plurality of unit panel areas on which the driving device and the color filter layer are formed. In Step S108, the assembled upper and lower glass substrates 5 and 3 are cut into unit panels. In Step S109, liquid crystal material is injected into the gap formed between the upper and lower substrates 5 and 3 of the unit panels through a liquid crystal injection hole and then the liquid crystal injecting hole is encapsulated or sealed by encapsulating material. In Step S110, the filled and sealed unit panel is tested.

FIG. 3 is a schematic view of a liquid crystal injection system for fabricating an LCD device according to the related art. In FIG. 3, a container 12 in which liquid crystal material 14 is contained is placed in a vacuum chamber 10, and the liquid crystal display panel 1 is located at an upper side of the container 12. Then, the vacuum chamber 10 is connected to a vacuum pump (not shown) to maintain a predetermined vacuum/pressure state within the vacuum chamber 10. In addition, a liquid crystal display panel moving device (not shown) is installed in the vacuum chamber 10 to move the liquid crystal display panel 1 from the upper side of the container 12 to a surface of the liquid crystal material 14, thereby contacting an injection hole 16 of the liquid crystal display panel 1 to the liquid crystal material 14. Accordingly, this method is commonly called as a liquid crystal dipping injection method.

When the vacuum/pressure level within the chamber 10 is decreased by an inflow of nitrogen gas ($N_2$) into the vacuum chamber 10 in the state that the injection hole 16 of the liquid crystal display panel 1 contacts the surface of the liquid crystal material 14, the liquid crystal material 14 is injected into the liquid crystal display panel 1 through the injection hole 16 by the pressure differential between the vacuum/pressure level within the liquid crystal display panel 1 and the pressure/level within the vacuum chamber 10. After the liquid crystal material 14 is completely filled into the liquid crystal display panel 1, the injection hole 16 is sealed by a sealant to seal the liquid crystal material 14 within the liquid crystal display panel 1. Accordingly, this method is called as a vacuum injection method.

However, there are several problems with both the liquid crystal dipping injection method and/or vacuum injection method. First, an overall time for injection of the liquid crystal material 14 into the panel 1 is relatively long for either method. In general, a gap thickness between the driving device array substrate and the color filter substrate in the liquid crystal display panel 1 is relatively narrow, i.e., a few micrometers. Accordingly, a relatively small amount of liquid crystal material 14 is injected into the liquid crystal display panel 1 per unit time. For example, it takes about 8 hours to completely inject the liquid crystal material 14 into a 15-inch liquid crystal display panel, and thus, fabricating efficiency is decreased. Second, consumption of the liquid crystal material 14 during the liquid crystal injection method is large. Only a small amount of the liquid crystal material 14 in the container 12 is actually injected into the liquid crystal display panel 1. Accordingly, during loading of the liquid crystal display panel 1 into the vacuum chamber 10, the unused liquid crystal material 14 is exposed to atmosphere or to certain gases, thereby contaminating the liquid crystal material 14. Thus, any remaining liquid crystal material 14 must be discarded after the injection of the liquid crystal material 14 into a plurality of liquid crystal display panels 1, thereby increasing fabricating costs.

SUMMARY OF THE INVENTION

Accordingly, the present invention is directed to a liquid crystal dispensing system that substantially obviates one or more of the problems due to limitations and disadvantages of the related art.

An object of the present invention is to provide a liquid crystal dispensing system for directly dispensing liquid crystal onto a glass substrate of a large area including at least one liquid crystal panel.

Another object of the present invention is to provide a liquid crystal dispensing system for preventing an inferiority of a liquid crystal dispensing by real time monitoring a dispensing amount of liquid crystal by real time measuring an amount of liquid crystal.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the liquid crystal dispensing system comprises a container for containing liquid crystal; a liquid crystal measuring sensor proximate the container; a discharge pump for pumping liquid crystal from the container, the discharge pump having a cylinder, a piston inserted into the cylinder, the piston having a longitudinal axis and a groove, the groove being located at a lower portion of the piston for pumping liquid crystal by rotational and axial movement, a case for housing the cylinder and the piston, and pump inlet and discharge openings for receiving and discharging liquid crystal, respectively, as the piston moves; and a nozzle in fluid communication with the pump discharge opening for dispensing liquid crystal discharged from the discharge pump onto a substrate.

In another aspect, an apparatus for supplying liquid crystal material comprises a container for storing liquid crystal material; a drive member; a pump for transferring liquid crystal material from the container, the pump including: a member having at least two outer surfaces and a recess extending from one outer surface toward an interior of the member, the recess being defined by at least two inner surfaces, and first and second bores extending from the at least one other outer surface to the recess, the first bore for receiving liquid crystal material and the second bore for discharging liquid crystal material from the pump, the first bore being in fluid communication with the container, and a piston for transferring liquid crystal material from the first bore to the second bore, the piston having a longitudinal axis and proximal and distal ends, the proximal end connected to the drive member and the distal end received in the recess such that movement of the drive member moves the piston in the recess for transferring liquid crystal material in the first bore to the second bore; and a metering system for regulating the transfer of liquid crystal material from the container, the metering system having a sensor for measuring liquid crystal material in the container and a controller for regulating liquid crystal material transfer by the pump.

In another aspect, an apparatus for placing liquid crystal material on a substrate comprises a container for storing liquid crystal material; a drive member; a pump for transferring liquid crystal material from the container, the pump including: a member having at least two outer surfaces and a recess extending from one outer surface toward an interior of the member, the recess being defined by at least two inner surfaces, and first and second bores extending from the at least one other outer surface to the recess, the first bore for receiving liquid crystal material and the second bore for discharging liquid crystal material from the pump, the first bore being in fluid communication with the container, and a piston for transferring liquid crystal material from the first bore to the second bore, the piston having a longitudinal axis and proximal and distal ends, the proximal end connected to the drive member and the distal end received in the recess such that movement of the drive member moves the piston in the recess for transferring liquid crystal material in the first bore to the second bore; and a metering system for regulating the transfer of liquid crystal material from the container, the metering system having a sensor for measuring liquid crystal material in the container and a controller for regulating liquid crystal material transfer by the pump, wherein the drive member has a central axis, and the proximal end of the piston is secured to the drive member at an attachment site such that the longitudinal axis of the piston and the central axis of the drive member intersect to form a fixation angle for controlling relative movement between the piston and recess such that the fixation angle regulates pump discharge capacity.

In yet another aspect, a method of dispensing liquid crystal material comprises providing a variable discharge pump having a discharge nozzle and an adjustable stroke length for adjusting pump discharge; supplying the pump with a supply of liquid crystal material; positioning a first substrate proximate the nozzle; setting a target dispensing amount of liquid crystal material for the substrate; setting a first liquid crystal material dispensing amount limitation value; pumping liquid crystal material from the supply to the nozzle; measuring a first amount of liquid crystal material in the supply; transferring liquid crystal material from the nozzle to the first substrate; measuring a second amount of liquid crystal material remaining in the supply; calculating a substantial dispensing amount of liquid crystal material transferred from the nozzle to the substrate, the substantial dispensing amount of liquid crystal material transferred from the nozzle to the first substrate being equal to the first amount of liquid crystal in the supply minus the second amount of liquid crystal material remaining in the supply; calculating a differential value equal to the substantial dispensing amount of liquid crystal material minus the target dispensing amount of liquid crystal material; and performing one or more actions based on a comparison of the differential value to the first liquid crystal material dispensing amount limitation value, the one or more actions performed including increasing discharge of the pump, if the differential value is greater than the first dispensing amount limitation.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

In order to solve the problems of the related liquid crystal injection methods such as a liquid crystal dipping method or a liquid crystal vacuum injection method, a liquid crystal dropping method has been recently introduced. The liquid crystal dropping method is a method for forming a liquid crystal layer by directly dropping the liquid crystal onto the substrates and spreading the dropped liquid crystal over the entire panel by pressing together the substrates during the assembling procedure of the substrates rather than by injecting the liquid crystal into the empty unit panel by the pressure difference between the inner and outer sides of the panel. According to the above liquid crystal dropping method, the liquid crystal is directly dropped onto the substrate in a short time period so that the liquid crystal layer in a LCD of larger area can be formed quickly. In addition, the liquid crystal consumption can be minimized due to the direct dropping of the liquid crystal as much as required amount, and therefore, the fabrication cost can be reduced.

Figure 4:
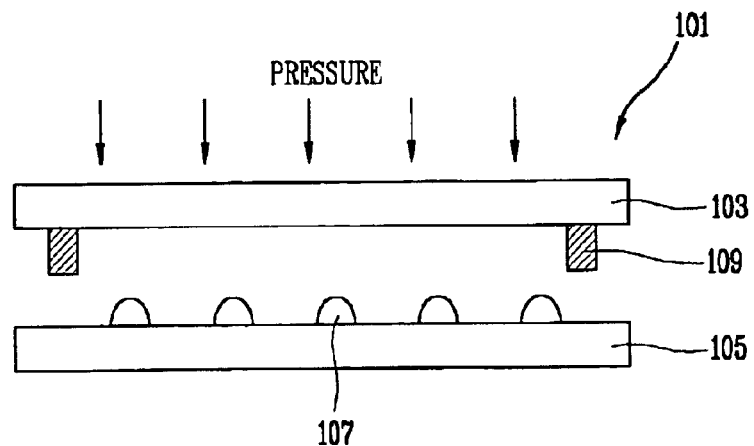
FIG. 4 is a cross sectional view of an LCD device fabricated by a liquid crystal dispensing method according to an embodiment of the present invention.

FIG. 4 is a view illustrating a basic concept of a liquid crystal dispensing method according to an embodiment of the present invention. In FIG. 4, liquid crystal material 107 may be dropped onto a lower substrate 105 having a driving device prior to assembling the lower substrate 105 and an upper substrate 103 having a color filter. Alternatively, the liquid crystal material 107 may be dropped onto the upper substrate 103 upon which the color filter is formed. For example, the liquid crystal material 107 may be formed either on a thin film transistor (TFT) substrate or on a color filter (CF) substrate.

A sealant 109 may be applied along at least an outer perimeter portion of the upper substrate 103. Then, the upper substrate 103 and the lower substrate 105 may be assembled together by pressing the upper and lower substrates 103 and 105 together to form an LCD display panel 101. Accordingly, the drops of the liquid crystal material 107 may spread out between the upper and lower substrates 103 and 105 by pressure applied to the upper and/or lower substrates 103 and 105, thereby forming a liquid crystal material layer of uniform thickness between the upper substrate 103 and the lower substrate 105. Thus, in the exemplary LCD device fabrication method, the liquid crystal material 107 may be dropped onto the lower substrate 105 before the upper and lower substrates 103 and 105 are attached together to form the LCD display panel 101.

Figure 5:
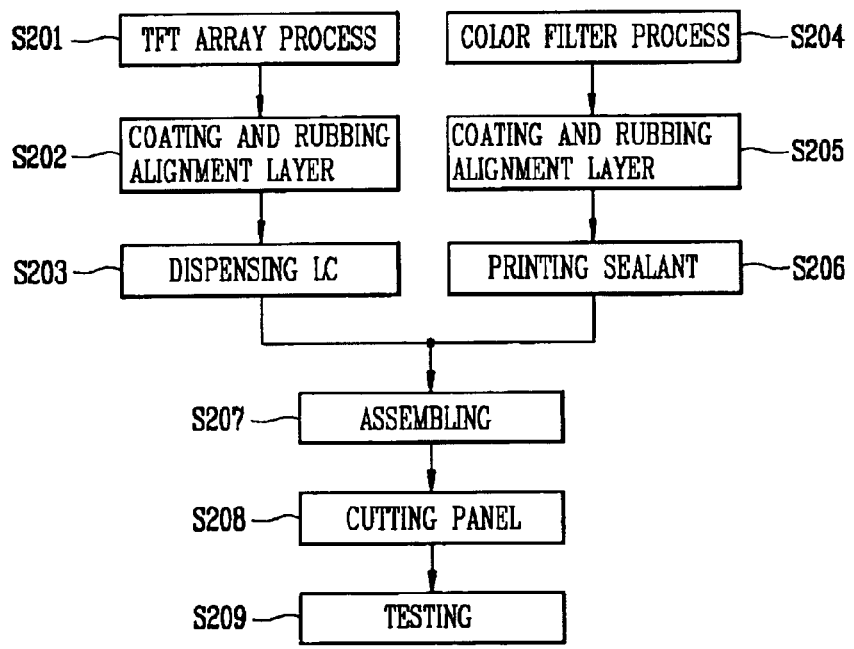
FIG. 5 is a flow chart of a fabrication method of an LCD device by a liquid crystal dispensing method according to an embodiment of the present invention.

FIG. 5 is a flow chart of an exemplary LCD device fabrication method according to an embodiment of the present invention. In Step S201, a driving device, such as a TFT, may be formed on an upper substrate using a TFT array process. In Step S204, a color filter layer may be formed on a lower substrate 105 using a color filter process. The TFT array process and the color filter process, which are generally similar to those of common processes may be preferably applied to glass substrates having a plurality of unit panel areas. Herein, the upper and lower substrates may include a glass substrate having an area about 1000×1200 mm² or more. However, glass substrates having smaller areas also may be used.

In Steps S202 and S205, alignment layers may be formed and rubbed on both the upper and lower substrates. In Step S203, liquid crystal material 107 may be dropped onto a liquid crystal display unit panel area of the lower substrate 105. In Step S206, sealant 109 may be applied along at least an outer perimeter portion area of the liquid crystal display unit panel area on the upper substrate.

In Step S207, the upper and lower substrates may be disposed to face each other, and may be compressed to join the upper and lower substrates to each other using the sealant. Accordingly, the dropped liquid crystal material may evenly spread out between the upper and lower substrates and the sealant. In Step S208, the assembled upper and lower substrates may be processed and cut into a plurality of liquid crystal display unit panels. In Step S209, the liquid crystal display unit panels may be tested.

Figure 1:
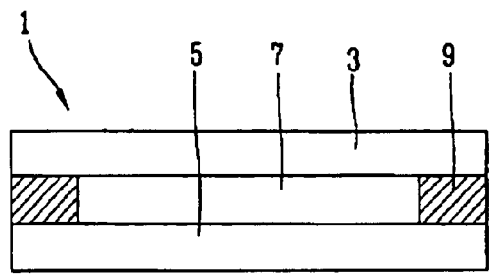
FIG. 1 is a sectional view of a liquid crystal display (LCD) device according to the related art.
Figure 2:
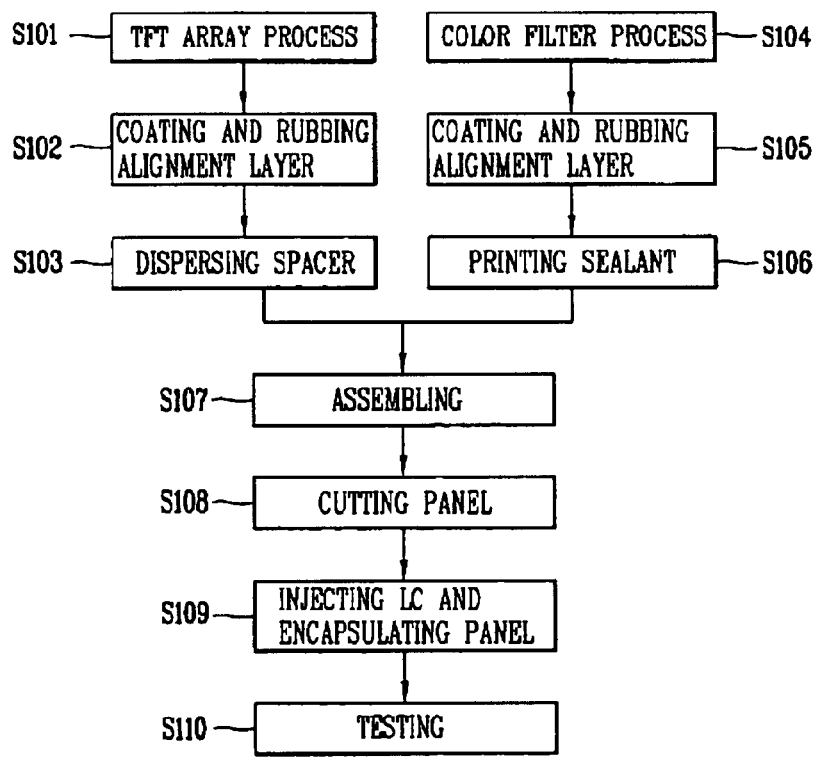
FIG. 2 is a flow chart of a fabrication method for an LCD device according to the related art.
Figure 3:
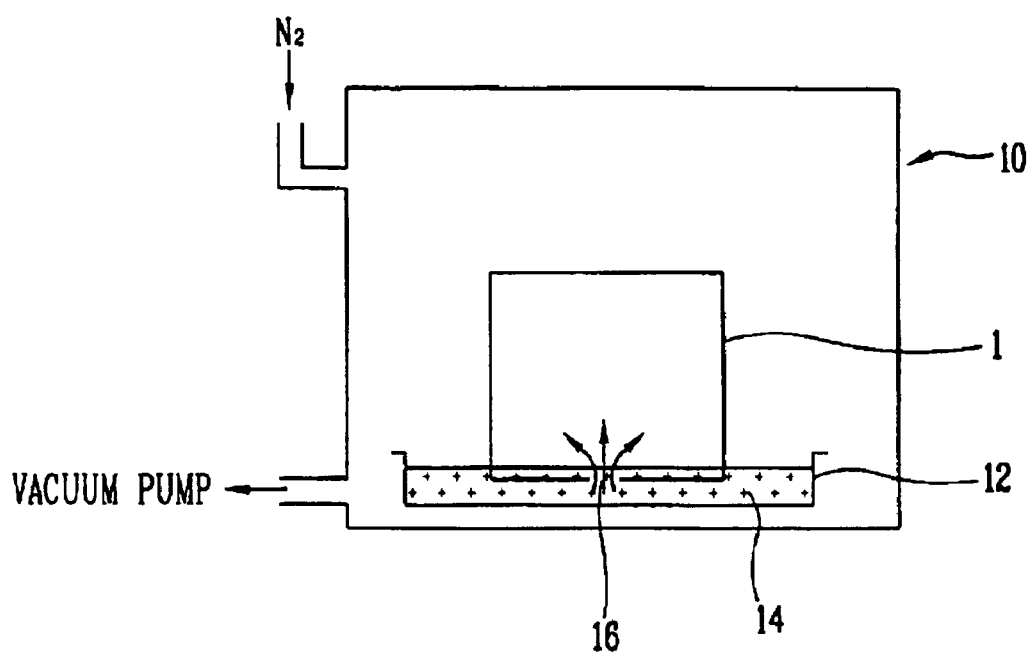
FIG. 3 is a schematic view of a liquid crystal injection system for fabricating an LCD device according to the related art.

The LCD device fabrication method using the liquid crystal dropping method of FIG. 5 is different from the LCD device fabrication method using the related art liquid crystal injection method in that a vacuum injection of liquid crystal is not used but rather a liquid crystal dropping, thereby reducing the processing time of a large area glass substrate. That is, in the LCD device fabrication method using the liquid crystal injection method of FIG. 2, liquid crystal is injected through an injection hole and then the injection hole is encapsulated by an encapsulation material. However, in the LCD device fabrication method using the liquid crystal dropping method, liquid crystal is directly dropped onto the substrate and does not require the process sealing of the injection hole. Although not shown in FIG. 2, in the LCD device fabrication method using the liquid crystal injection method, the substrate is contacting the liquid crystal at the time of injecting liquid crystal so that an outer surface of the panel is contaminated by the liquid crystal. Therefore, a process for washing the contaminated substrate is required. However, in the LCD device fabrication method using the liquid crystal dropping method, liquid crystal is directly dropped onto the substrate so that the panel is not contaminated by the liquid crystal, and a washing process is not required. The LCD device fabrication method using the liquid crystal dropping method is more simple than the LCD device fabrication method using the liquid crystal injection method, thereby having an increased fabricating efficiency and an increased yield.

In the LCD device fabrication method using the liquid crystal dropping method, a dropping position of liquid crystal and a dropping amount of liquid crystal have the most influence on a forming a liquid crystal layer with a desired thickness. Especially, since the thickness of a liquid crystal layer is closely related to a cell gap of a liquid crystal panel, a precise dropping position of liquid crystal and a precise amount of liquid crystal are very important to prevent inferiority of a liquid crystal panel. To drop a precise amount of liquid crystal onto a precise position, a liquid crystal dispenser is provided in the present invention.

Figure 6:
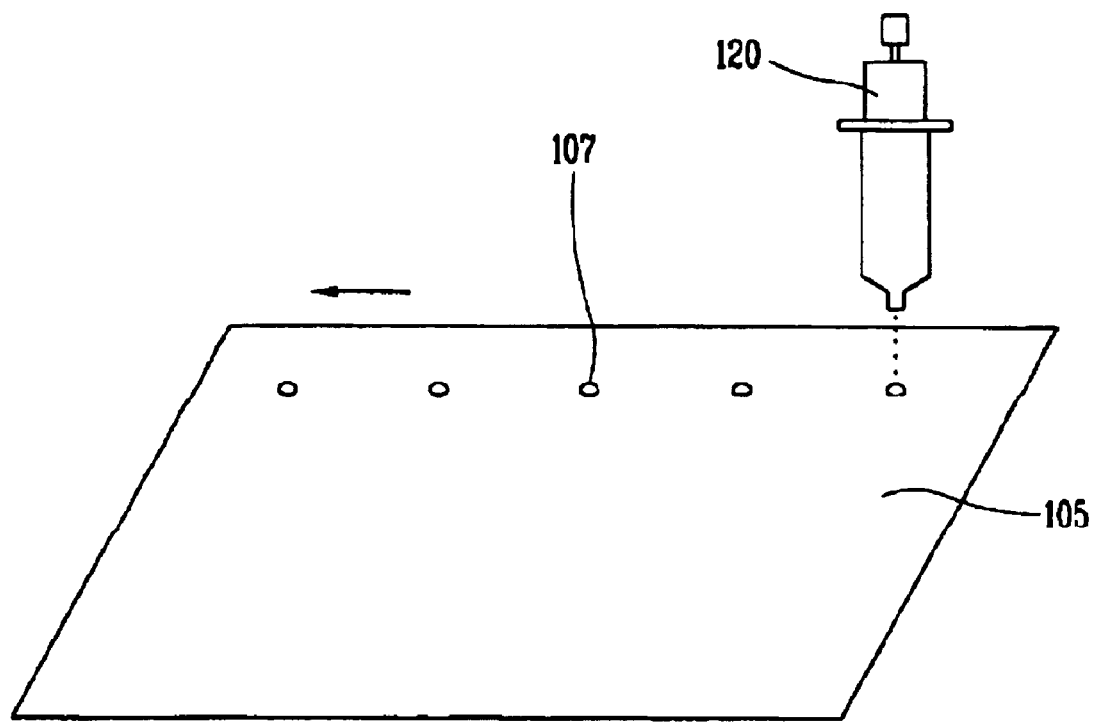
FIG. 6 is a view of a basic concept of a liquid crystal dispensing method.

FIG. 6 is a perspective view of another exemplary LCD device fabrication method according to an embodiment of the present invention. In FIG. 6, liquid crystal material 107 may be dispensed onto a glass substrate 105 using a liquid crystal dispenser 120 positioned above the glass substrate 105. Although not shown, the liquid crystal material 107 may be contained in the liquid crystal dispenser 120. As the liquid crystal material 107 is dropped onto the glass substrate 105, the glass substrate 105 may move along x- and y-directions according to a predetermined speed, while the liquid crystal dispenser 120 discharges the liquid crystal material 107 at predetermined time intervals. Accordingly, the liquid crystal material 107 dropping onto the glass substrate 105 may be arranged along x- and y-directions with predetermined intervals therebetween. Alternatively, the glass substrate 105 may be fixed, while the liquid crystal dispenser 120 moves along the x- and y-directions to drop the liquid crystal material 107 at predetermined intervals. However, a shape of the liquid crystal material 107 may be altered by any vibration of the liquid crystal dispenser 120, whereby errors in the dropping position and the dropping amount of the liquid crystal material 107 may occur. Therefore, it may be preferable that the liquid crystal dispenser 120 be fixed and that the glass substrate 105 be moved.

Figure 7:
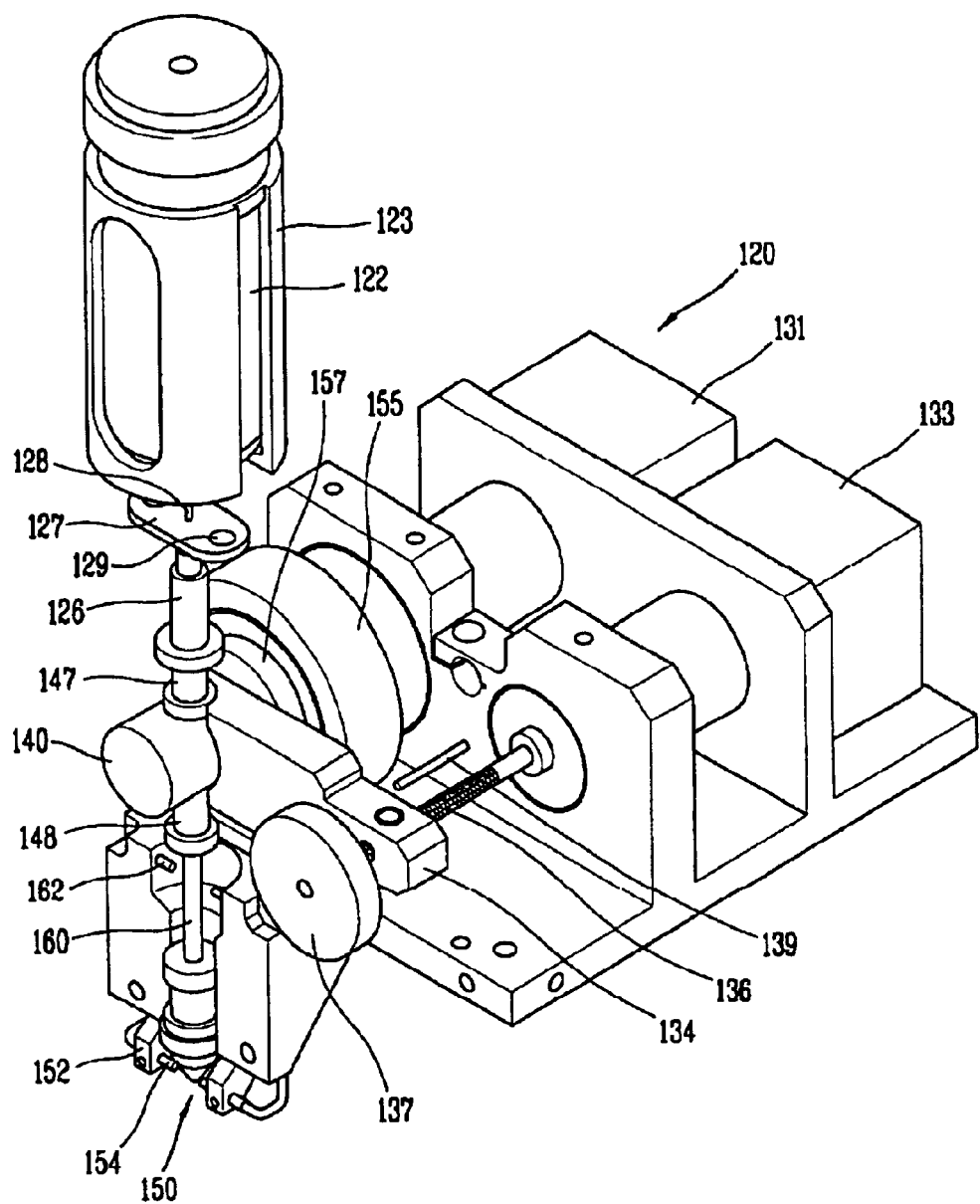
FIG. 7 is a perspective view of a liquid crystal dispenser according to an embodiment of the present invention.
Figure 8:
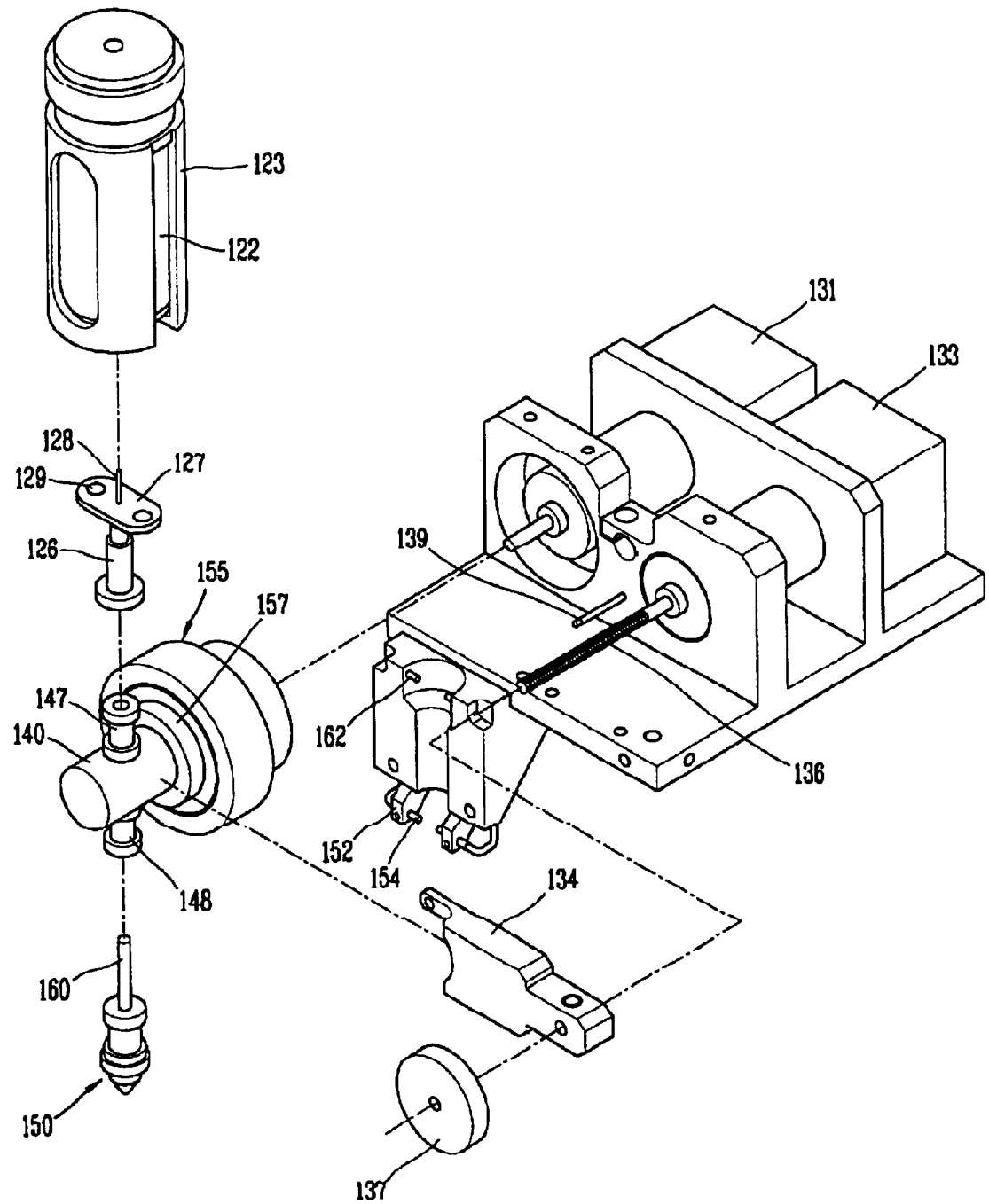
FIG. 8 is a disassembled perspective view of the liquid crystal dispenser according to an embodiment of the present invention.

FIG. 7 is a perspective view of the liquid crystal dispenser according to an embodiment of the present invention, and FIG. 8 is a disassembled perspective view of the liquid crystal dispenser according to an embodiment of the present invention. In FIGS. 7A and 7B, the liquid crystal dispenser 120 may include a cylindrically shaped liquid crystal material container 122 accommodated in a case 123. The liquid crystal material container 122 is formed of polyethylene, and the liquid crystal 107 is contained in the liquid crystal material container 122. The case 123 is formed of a stainless steel and accommodates the liquid crystal material container 122 therein. Since the polyethylene has a high plasticity, a container of a desired shape can be easily formed with the polyethylene. Also, the polyethylene is non-reactive with the liquid crystal material 107 when the liquid crystal material 107 is contained therein, thereby being mainly used as the liquid crystal material container 122. However, the polyethylene has a low strength and may therefore become easily deformed by application of stress. When the liquid crystal material container 122 is deformed, the liquid crystal material 107 may not be precisely dispensed onto a substrate. Accordingly, the liquid crystal material container 122 may be inserted within the case 123 formed of stainless steel having a high strength.

Although not shown, a gas supply tube may be arranged at an upper portion of the liquid crystal material container 122, so that inert gas, such as nitrogen, may be provided thereto. The gas is supplied within portions of the liquid crystal material container 122 not occupied by the liquid crystal material 107. Accordingly, the gas presses on the liquid crystal material 107 and induces the liquid crystal material to be dispensed onto the substrate.

The liquid crystal material container 122 may include a material that does not deform, such as stainless steel. Accordingly, when the liquid crystal material container 122 is formed out of stainless steel, the case 123 may not be required, thereby reducing fabrication costs of the liquid crystal dispenser 120. The interior of the liquid crystal material container 122 may be coated with a fluorine resin, thereby preventing the liquid crystal material 107 contained within the liquid crystal material container 122 from chemically reacting with sidewalls of the liquid crystal material container 122.

A liquid crystal discharge pump 140 is arranged at a lower portion of the liquid crystal material container 122. The liquid crystal discharge pump 140 is for discharging a certain amount of liquid crystal from the liquid crystal material container 122 onto a substrate. The liquid crystal discharge pump 140 is provided with a liquid crystal suction (or intake) opening 147 connected to the liquid crystal material container 122 for drawing in liquid crystal in accordance with the operation of the liquid crystal discharge pump 140, and a liquid crystal discharge opening 148 at the opposite side of the liquid crystal suction opening 147 for discharging liquid crystal in accordance with the operation of the liquid crystal discharge pump 140.

In FIG. 8, a first connecting tube 126 is coupled to the liquid crystal suction opening 147, and a supporting unit 127 is installed at another end of the first connecting tube 126. The supporting unit 127 for supporting the liquid crystal material container 122 is provided with at least one sensor, for example a gravimeter 129 such as a load cell, at an upper surface thereof (that is, the surface contacting the liquid crystal material container 122) for measuring liquid crystal material in the container 122. Thus, an amount of the liquid crystal material in the container may be measured by a sensor proximate the container. As described above, the sensor may be a gravimeter, which measures the weight of the liquid crystal in the container. However, any suitable sensor which can measure an amount of liquid crystal material in the container may be used provided the sensor can generate an appropriate signal for use with a control unit. Moreover, the sensor need not be placed under the container as described in the embodiment above. Rather, the sensor may be placed in any suitable location such that the sensor can accurately and reliably measure the amount of liquid crystal material in the container.

The gravimeter 129 may be in a state of a zero point with the weight of the empty liquid crystal material container 122 where liquid crystal is not contained, so that a measured value is the weight of pure liquid crystal contained in the liquid crystal material container 122. Although not shown, a value measured by the gravimeter 129 is input to a control unit. Since the liquid crystal contained in the liquid crystal material container 122 has a preset weight (this value is stored in the control unit), a varied amount of the liquid crystal contained in the liquid crystal material container 122 and a remaining amount may be calculated based on the measured weight of the liquid crystal.

Although the liquid crystal suction opening 147 is coupled to the first connecting tube 126 by being inserted in drawing, the liquid crystal suction opening 147 can be coupled to the first connecting tube 126 by a coupling means such as a screw. A pin 128 such as an injection needle of which inside is penetrated is formed at one side of the first connecting tube 126, that is, at the supporting unit 129. A pad (not shown) formed of a material having a high contraction characteristic and a hermetic characteristic such as silicon or butyl rubber group material is arranged at a lower portion of the liquid crystal material container 122 for discharging liquid crystal to the first connecting tube 126. The pin 128 is inserted into the liquid crystal material container 122 through the pad, thereby introducing the liquid crystal 107 of the liquid crystal material container 122 into the liquid crystal suction opening 147. When the pin 128 is inserted into the liquid crystal material container 122, the pad forms a seal around the pin 128, thereby preventing leakage of the liquid crystal 107 to the insertion region of the pin 128. Since the liquid crystal suction opening 147 and the liquid crystal material container 122 are coupled to each other by the pin and the pad, the coupling structure is simple and the coupling/detachment is facilitated. Alternatively, the liquid crystal suction opening 147 and the first connecting tube 126 may be formed as a unit. In this case, the pin 128 is formed at the liquid crystal suction opening 147 and is directly inserted into the liquid crystal material container 122 to discharge liquid crystal, thereby having a simple structure.

A nozzle 150 is formed at a lower portion of the liquid crystal discharge pump 140. The nozzle 150 is connected to the liquid crystal discharge opening 148 of the liquid crystal discharge pump 140 through a second connecting tube 160, thereby dropping the liquid crystal 107 discharged from the liquid crystal discharge pump 140 onto the substrate. The second connecting tube 160 may be formed of an opaque material. However, the second connecting tube 160 is formed of a transparent material due to the following reasons.

At the time of the liquid crystal dropping, if vapor is contained in the liquid crystal 107, a dispensing amount of the liquid crystal 107 dispensed onto the substrate may not be precisely controlled. Therefore, the vapor should be removed at the time of the liquid crystal dropping. Vapor in liquid crystal 107 to be contained in the container 122 or vapor in the liquid crystal 107 already in the container 122 can be removed by a vapor removing device, but the vapor may not be completely removed. Moreover, vapor may be generated when the liquid crystal 107 is introduced into the liquid crystal discharge pump 140 from the liquid crystal material container 122. Accordingly, to most completely remove the vapor contained in the liquid crystal 107, it is the better to remove the vapor by stopping the operation of the liquid crystal dispenser at the time of liquid crystal dropping. The reason why the second connecting tube 160 is formed of a transparent material is to prevent inferiority of the LCD device by easily finding vapor contained in the liquid crystal material container 122 or vapor generated from the liquid crystal material container 122. The vapor can be found by the user's naked eyes, and can be automatically detected by a first sensor 162 such as a photo coupler installed at both sides of the second connecting tube 160, in which the latter case can prevent the inferiority of the LCD device more certainly.

The nozzle 150 into which the discharged liquid crystal is introduced through the second connecting tube 160 is provided with a protection unit 152 for protecting the nozzle 150 from external stress and etc. at both side surfaces thereof. Also, a second sensor 154 for detecting whether vapor is contained in the liquid crystal dropped from the nozzle 150 or whether liquid crystal masses on the surface of the nozzle 150 is installed at the protection unit 152 at the lower portion of the nozzle 150.

The phenomenon that the liquid crystal masses on the surface of the nozzle 150 prevents a precise dropping of the liquid crystal 107. When the liquid crystal drops through the nozzle 150, a certain amount of liquid crystal spreads on the surface of the nozzle 150 even if a preset amount of liquid crystal is discharged from the liquid crystal discharge pump 140. According to this, liquid crystal of less amount than the preset amount is dispensed onto the substrate. Also, when the liquid crystal that masses on the surface of the nozzle 150 drops on the substrate, inferiority of the LCD device may be generated. To prevent the liquid crystal from massing on the surface of the nozzle 150, material such as fluorine resin having a high contact angle with liquid crystal, that is a hydrophobic material, may be deposited on the surface of the nozzle 150 by a dipping method or a spray method. By the deposition of the fluorine resin, the liquid crystal does not spread on the surface of the nozzle 150, but is dispensed onto the substrate through the nozzle 150 as a perfect drop shape.

The liquid crystal discharge pump 140 is received within a rotating member 157 that is secured to a fixing unit 155. The rotating member 157 is connected to a first motor 131. As the first motor 131 is operated, the rotating member 157 is rotated and the liquid crystal discharge pump 140 connected to the rotating member 157 is operated.

The liquid crystal discharge pump 140 is in contact with one side of a liquid crystal capacity amount controlling member 134 having a bar shape. A hole is formed at another side of the liquid crystal capacity amount controlling member 134, and a rotational shaft 136 is inserted into the hole. A screw is formed at the perimeter of the hole of the liquid crystal capacity amount controlling member 134 and the rotational shaft 136, so that the liquid crystal capacity amount controlling member 134 and the rotational shaft 136 are screw-coupled to each other. One end of the rotational shaft 136 is connected to a second motor 133, and another end thereof is connected to a controlling lever 137.

The discharge amount of liquid crystal from the liquid crystal material container 122 through the liquid crystal discharge pump 140 is varied according to a fixation angle of the liquid crystal discharge pump 140 to the rotating member 157. That is, a liquid crystal capacity amount of the liquid crystal discharge pump 140 is varied according to an angle that the liquid crystal discharge pump 140 is fixed to the rotating member 157. When the second motor 133 connected to the rotational shaft 136 is driven (automatically controlled) or the controlling lever 137 is operated (manually controlled), the rotational shaft 136 is rotated. According to this, one end of the liquid crystal capacity amount controlling member 134 screw-coupled to the rotational shaft 136 moves back and forth (linear direction)

along the rotational shaft 136. Accordingly, as one end of the liquid crystal capacity amount controlling member 134 moves, a force applied to the liquid crystal discharge pump 140 is varied, and therefore the fixation angle of the liquid crystal discharge pump 140 is varied.

As aforementioned, the first motor 131 operates the liquid crystal discharge pump 140 to discharge liquid crystal of the liquid crystal material container 122 and to drop the liquid crystal onto the substrate. Also, the second motor 133 controls the fixation angle of the liquid crystal discharge pump 140 fixed to the rotating member 157 to control the amount of liquid crystal discharged from the liquid crystal discharge pump 140.

A single dispensing amount of liquid crystal dropped onto the substrate through the liquid crystal discharge pump 140 is very minute, and therefore, a variation amount of the liquid crystal discharge pump 140 controlled by the second motor 133 is also minute. Accordingly, to control the discharge amount of the liquid crystal discharge pump 140, an inclination angle of the liquid crystal discharge pump 140 has to be controlled very precisely. For the precise control, a step motor operated by a pulse input value is used as the second motor 133.

Figure 9A:
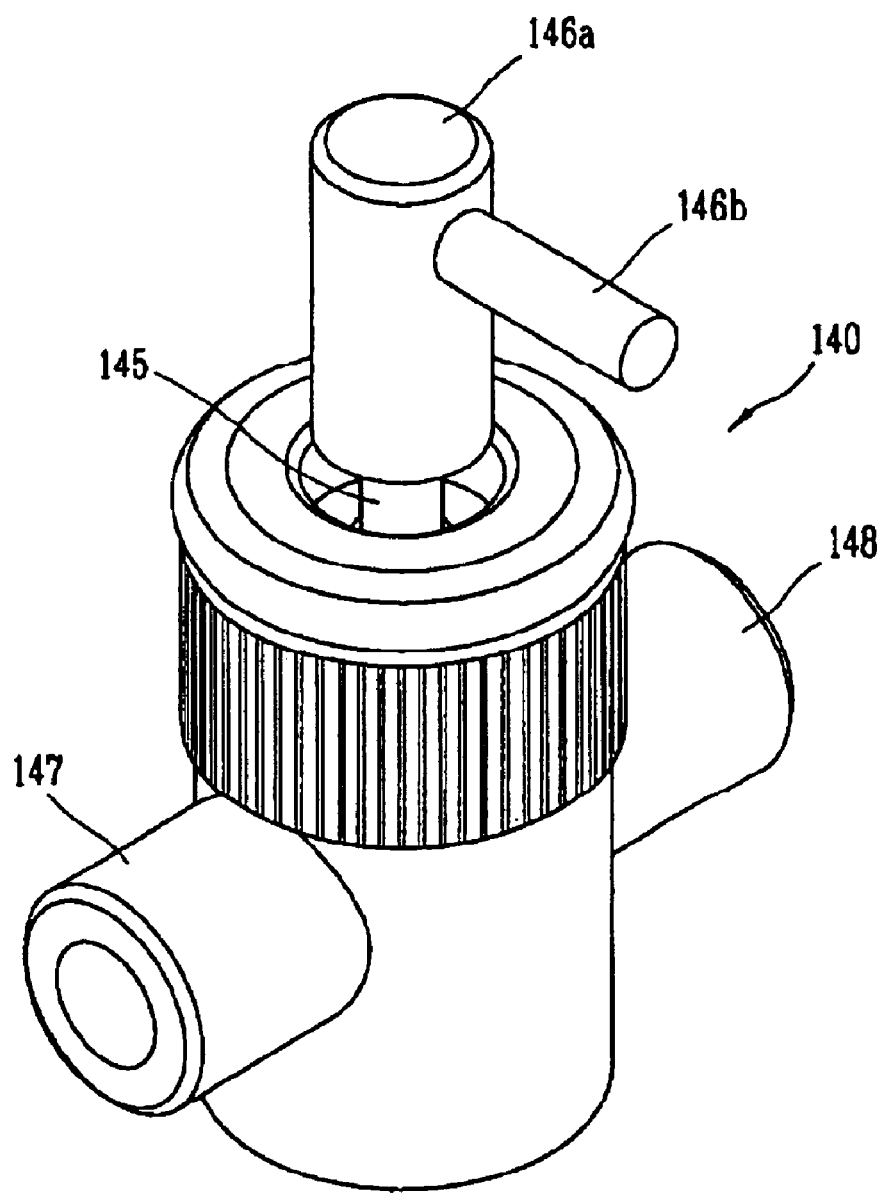
FIG. 9A is a perspective view of a liquid crystal discharge pump of the liquid crystal dispenser according to an embodiment of the present invention.
Figure 9B:
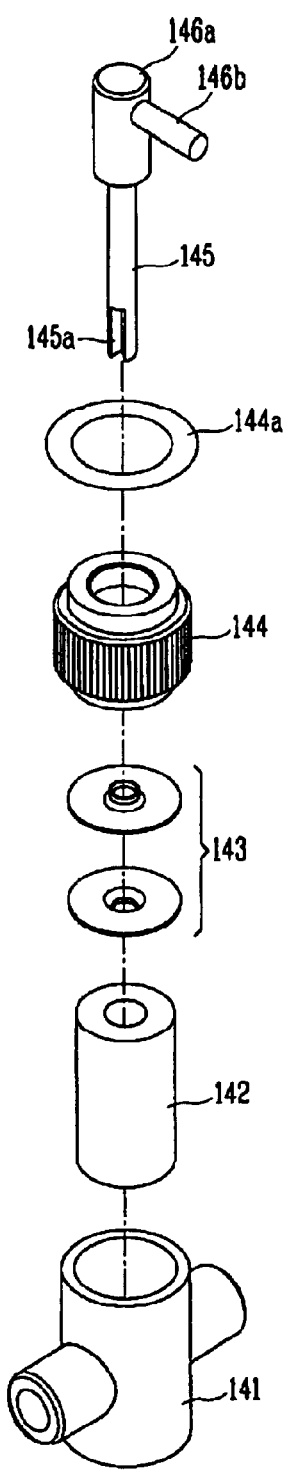
FIG. 9B is a disassembled perspective view of the liquid crystal discharge pump.

FIG. 9A is a perspective view of the liquid crystal discharge pump, and FIG. 9B is a disassembled perspective view of the liquid crystal discharge pump. In FIGS. 9A and 9B, the liquid crystal discharge pump 140 includes: a case 141 having the liquid crystal suction opening 147 and the liquid crystal discharge opening 148; a cap 144 having an opening at an upper portion thereof and coupled to the case 141; a cylinder 142 inserted into the case 141 for drawing in liquid crystal; a sealing member 143 for sealing the cylinder 142; an o-ring 144a positioned above the cap 144 for preventing liquid crystal from being leaked; and a piston 145 up-down moved and rotated by being inserted into the cylinder 142 through the opening of the cap 144, for drawing in and discharging the liquid crystal 107 through the liquid crystal suction opening 147 and the liquid crystal discharge opening 148. A head 146a fixed to the rotating member 157 is installed above the piston 145, and a bar 146b is installed at the head 146a. The bar 146b is inserted into a hole (not shown) of the rotating member 157 and is fixed, thereby rotating the piston 145 when the rotating member 157 is rotated by a force of the first motor 131.

In FIG. 9B, a groove 145a is formed at the end of the piston 145. The groove 145a has an area corresponding to approximately ¼ (or less than that) of a sectional area of a circle shape of the piston 145. The groove 145a opens and closes the liquid crystal suction opening 147 and the liquid crystal discharge opening 148 when the piston 145 is rotated (that is, up and down moved), thereby drawing in and discharging liquid crystal through the liquid crystal suction opening 147 and the liquid crystal discharge opening 148.

Operation of the liquid crystal discharge pump 140 will be explained as follows.

Figure 10:
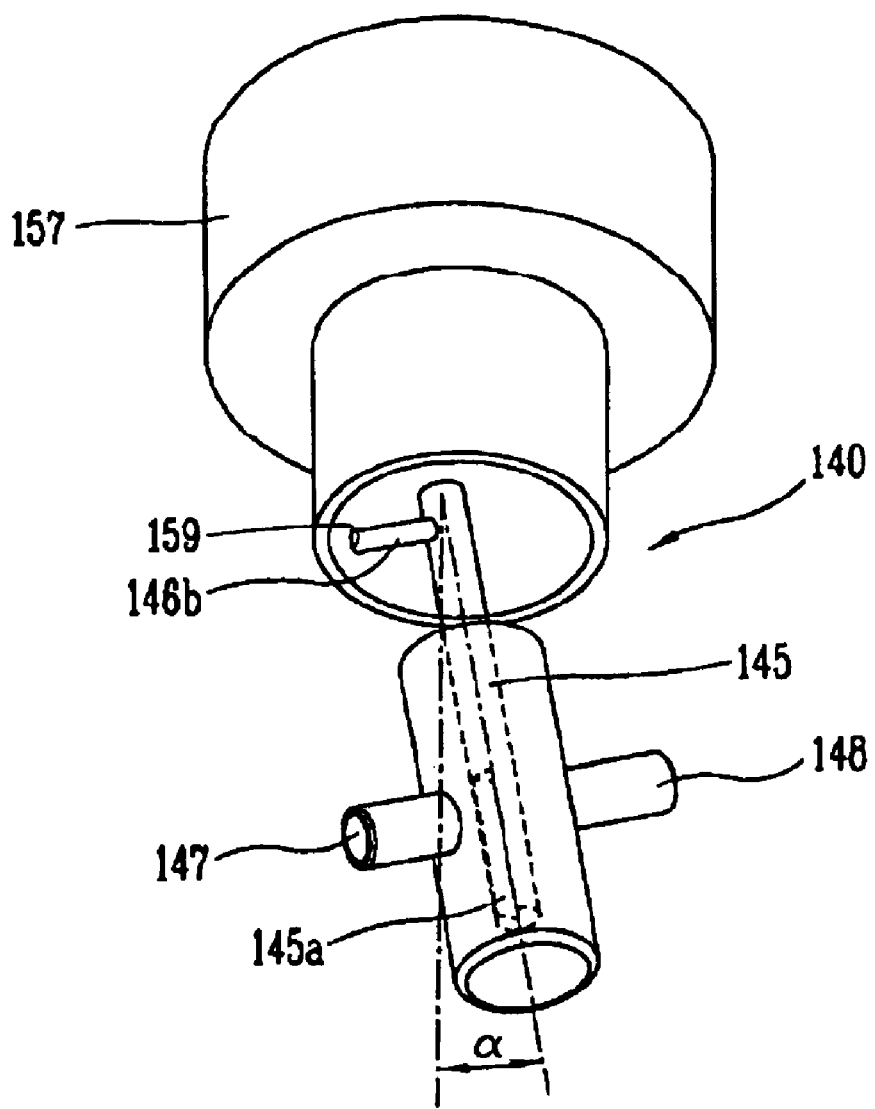
FIG. 10 is a view showing a state that the liquid crystal discharge pump is fixed to a fixing unit.

FIG. 10 is a view showing a state that the liquid crystal discharge pump 140 is fixed to the rotating member 157. In FIG. 10, the piston 145 is fixed to the rotating member 157 with a certain angle (α). The bar 146b formed at the piston head 146a is inserted into a hole 159 formed inside the rotating member 157, so that the piston 145 and the rotating member 157 are coupled to each other. Although not shown, a bearing is provided inside the hole 159 and thereby the bar 146b of the piston 145 inserted into the hole 159 can move back and forth and right and left. When the first motor 131 is operated, the rotating member 157 is rotated, thereby rotating the piston 145 coupled to the rotating member 157.

Herein, if the fixation angle (α) of the liquid crystal discharge pump for the rotating member 157, that is, the fixation angle (α) of the piston 145 for the rotating member 157 is supposed to be 0, the piston 145 performs only a rotational motion along the rotating member 157. However, since the fixation angle (α) of the piston 145 is not 0, substantially (that is, the piston 145 is fixed with a certain angle), the piston 145 not only rotates along the rotating member 157 but also up-down moves.

If the piston 145 moves upwardly by rotating with a certain angle, a space is formed inside the cylinder 142 and liquid crystal is drawn into the space through the liquid crystal suction opening 147. Then, if the piston 145 moves downwardly by rotating more, the liquid crystal in the cylinder 142 is discharged through the liquid crystal discharge opening 148. Herein, the groove 145a formed at the piston 145 opens and closes the liquid crystal suction opening 147 and the liquid crystal discharge opening 148 at the time of drawing in and discharging the liquid crystal by the rotation of the piston 145.

Figure 11A:
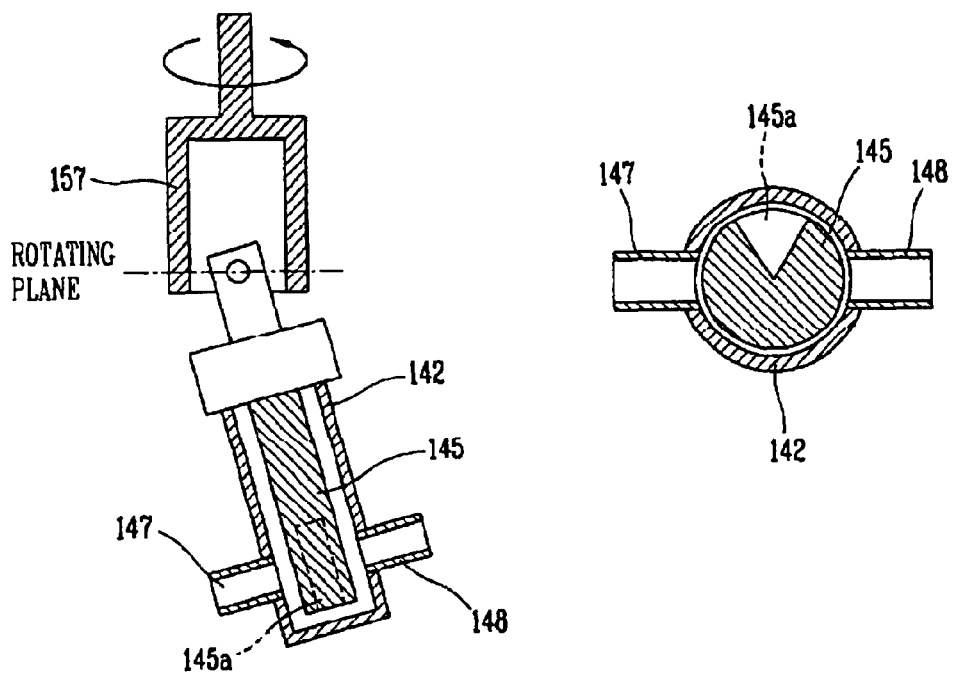
FIGS. 11A to 11D are operational views of the liquid crystal discharge pump.
Figure 11B:
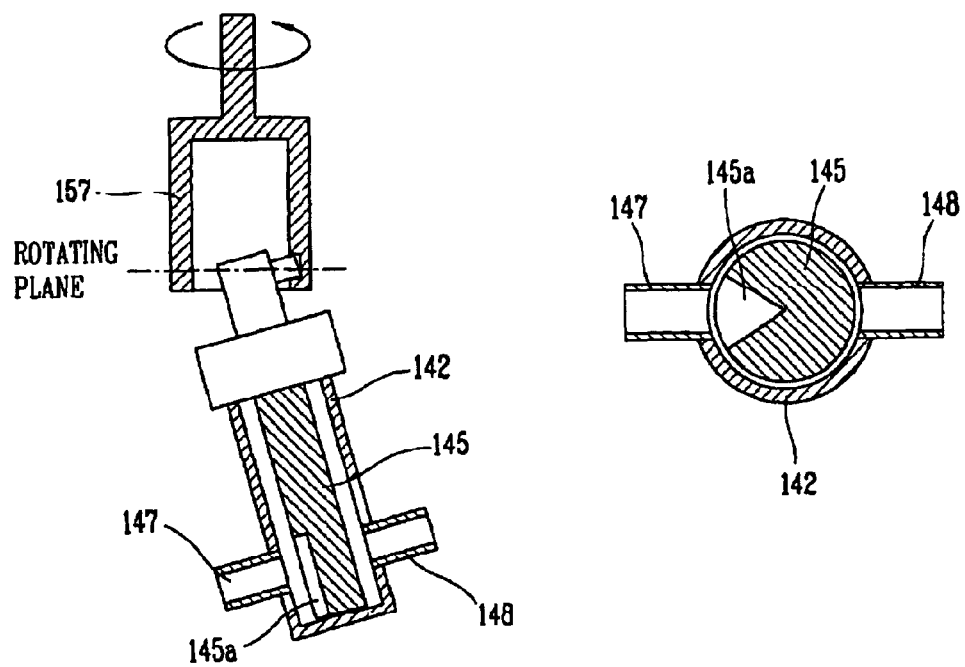
Figure 11C:
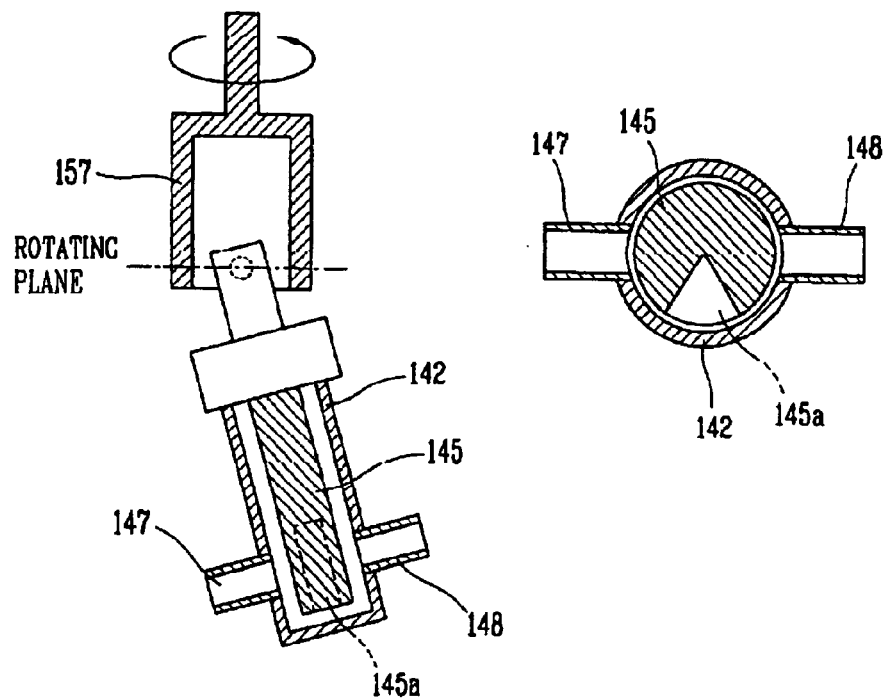
Figure 11D:
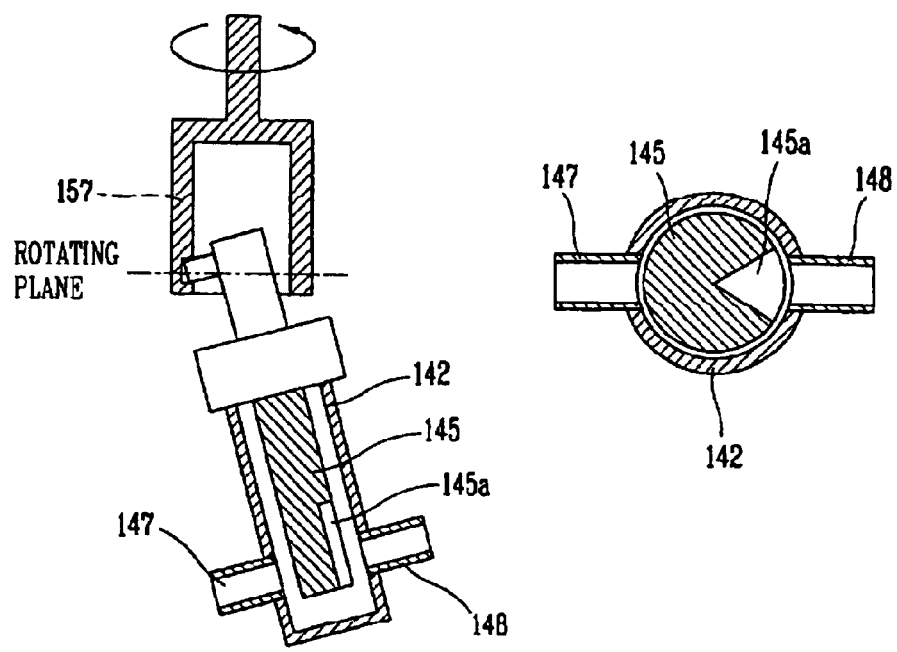

Hereinafter, operation of the liquid crystal disc charge pump 140 will be explained in more detail with reference to FIGS. 11A to 11D. In FIGS. 11A to 11D, the liquid crystal discharge pump 140 discharges the liquid crystal 107 of the liquid crystal material container 122 to the nozzle 150 through 4 strokes. FIGS. 11A and 11C are cross strokes, FIG. 11B is a suction stroke through the liquid crystal suction opening 147, and FIG. 11D is a discharge stroke through the liquid crystal discharge opening 148.

In FIG. 11A, the piston 145 fixed to the rotating member 157 with a certain angle (α) rotates accordingly as the rotating member 157 rotates. At this time, the liquid crystal suction opening 147 and the liquid crystal discharge opening 148 are closed by the piston 145.

When the rotating member 157 rotates with approximately 45°, the piston 145 rotates and the liquid crystal suction opening 147 is open by the groove 145a of the piston 145 as shown in FIG 11B. The bar 146b of the piston 145 is inserted into the hole 159 of the rotating member 157, thereby coupling the rotating member 157 and the piston 145. Accordingly as the rotating member 157 rotates, the piston 145 rotates. At this time, the bar 146b rotates along a rotating plane.

Since the piston 145 is fixed to the rotating member 157 with a certain angle and the bar 146b rotates along the rotating plane, the piston 145 moves upwardly accordingly as the rotating member 157 rotates. Also, accordingly as the rotating member 157 rotates, a space is formed at the cylinder 142 positioned at the lower portion of the piston 145 since the cylinder 142 is fixed. Therefore, liquid crystal is drawn into the space through the liquid crystal suction opening 147 that has been open by the groove 145a. The suction (or intake) stroke of liquid crystal continues until the cross stroke of FIG. 11C starts (the liquid crystal suction opening 147 is closed) as the rotating member 157 rotates with approximately 45° after the suction stroke starts (that is, the liquid crystal suction opening 147 is open).

Then, as shown in FIG. 11D, the liquid crystal discharge opening 148 is open and the piston 145 downwardly moves accordingly as the rotating member 157 rotates more, so that the liquid crystal sucked into the space inside the cylinder 142 is discharged through the liquid crystal discharge opening 148 (discharge stroke). As aforementioned, the liquid crystal discharge pump 140 repeats four strokes that is, the first cross stroke, the suction stroke, the second cross stroke, and the discharge stroke, thereby discharging the liquid crystal 107 contained in the liquid crystal material container 122 to the nozzle 150. Herein, the discharge amount of liquid crystal is varied according to an up-down motion range of the piston 145. The up-down motion range of the piston 145 is varied according to the angle of the liquid crystal discharge pump 140 fixed to the rotating member 157.

Figure 12:
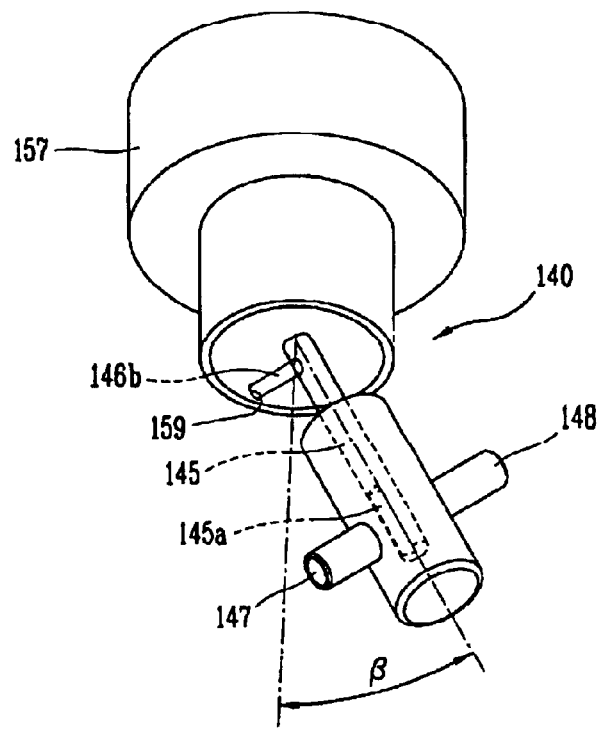
FIG. 12 is a view of the liquid crystal discharge pump of which a fixation angle has been increased.

FIG. 12 is a view showing that the liquid crystal discharge pump is fixed to the rotating member with an angle of β. When compared to the liquid crystal discharge pump 140 of FIG. 10 fixed to the rotating member 157 with the angle of a, the liquid crystal discharge pump 140 of FIG. 12 fixed to the rotating member 157 with an angle of β(>α) enables the piston 145 to upwardly move more highly. That is, the more the angle of the liquid crystal discharge pump 140 fixed to the rotating member 157 is, the more the amount of the liquid crystal 107 drawn into the cylinder 142 at the time of the piston motion is. This means that the discharge amount of liquid crystal can be controlled by adjusting the angle of the liquid crystal discharge pump 140 fixed to the rotating member 157.

The angle of the liquid crystal discharge pump 140 fixed to the rotating member 157 is controlled by the liquid crystal capacity amount controlling member 134 of FIG. 7, and the liquid crystal capacity amount controlling member 134 is moved by driving the second motor 133. That is, the angle of the liquid crystal discharge pump 140 fixed to the rotating member 157 is controlled by controlling the second motor 133.

The fixation angle of the liquid crystal discharge pump 140 can be manually adjusted by handling the angle controlling lever 137 by the user. However, in this case, a precise adjustment is not possible, a lot of time is required, and the driving of the liquid crystal discharge pump has to be stopped during the operation. Therefore, it is preferable to adjust the fixation angle of the liquid crystal discharge pump 140 by the second motor 133. The fixation angle of the liquid crystal discharge pump 140 is measured by a sensor 139 such as a linear variable differential transformer. If the fixation angle exceeds a preset angle, the sensor 139 rings the alarm thus to prevent the liquid crystal discharge pump 140 from being damaged. Although not shown, the second motor 133 is connected to a control unit by a wired or wireless connection. The control unit sets a dispensing amount of liquid crystal and calculates a current dispensing amount of liquid crystal being dispensed based on a value measured by the gravimeter 129 such as a load cell. A compensated discharge amount of liquid crystal may then be calculated and discharged as follows.

Figure 13:
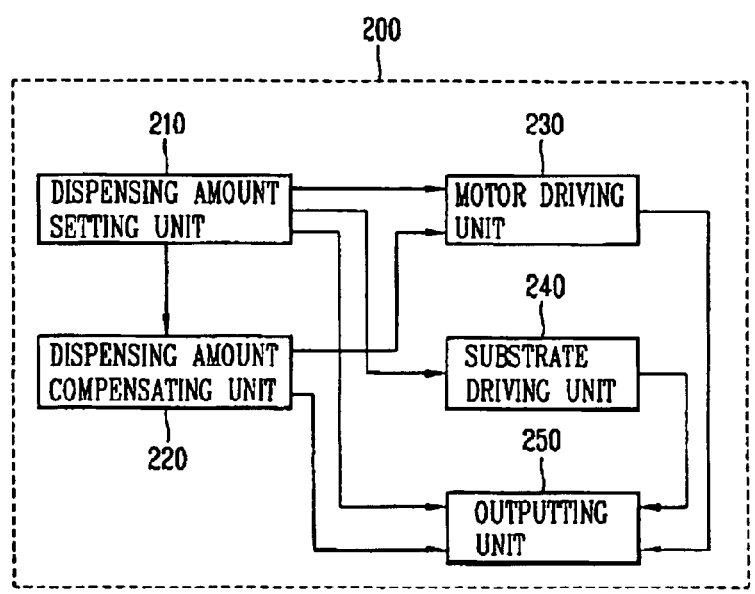
FIG. 13 is a block diagram of a control unit of a liquid crystal dispensing system according to an embodiment of the present invention.

In FIG. 13, the control unit 200 includes: a dispensing amount setting unit 210 for setting a dispensing amount of liquid crystal to be dropped onto the liquid crystal panel; a dispensing amount compensating unit 220 for compensating a dispensing amount of liquid crystal by controlling the second motor 133 and controlling the fixation angle of the liquid crystal discharge pump 140 when the preset dispensing amount of liquid crystal by the dispensing amount setting unit 210 is different from a substantial dispensing amount of liquid crystal onto the liquid crystal panel; a motor driving unit 230 for discharging the preset dispensing amount of liquid crystal by the dispensing amount setting unit 210 by the liquid crystal discharge pump 140 by controlling the first motor 131 and the second motor 133; a substrate driving unit 240 for driving the substrate and thereby aligning a dropping position of liquid crystal with the nozzle 150; and an outputting unit 250 for outputting each kind of information such as a substrate size, a panel size, a preset dispensing amount of liquid crystal, a current dispensing amount of liquid crystal, a dispensing position, and etc. and ringing an alarm at the time of an abnormality occurrence.

The outputting unit 250 is formed of a display such as a cathode ray tube (CRT) or an LCD and a printer, thereby informing the user each kind of information regarding a dropping of liquid crystal and informing the user a dropping abnormality by an alarm and etc.

The dispensing amount setting unit 210 is for setting a dispensing amount of liquid crystal dispensed onto the liquid crystal panel. An already calculated set amount can be manually input to the dispensing amount setting unit 210 by the user. However, for more precise dispensing amount setting, an optimum dispensing amount is automatically set on the basis of each kind of data. When the preset dispensing amount is different from the substantial dispensing amount of liquid crystal onto the substrate, the dispensing amount compensating unit 210 compensates a differential value of the dispensing amount thereby to prevent an inferiority of the LCD device.

Figure 14:
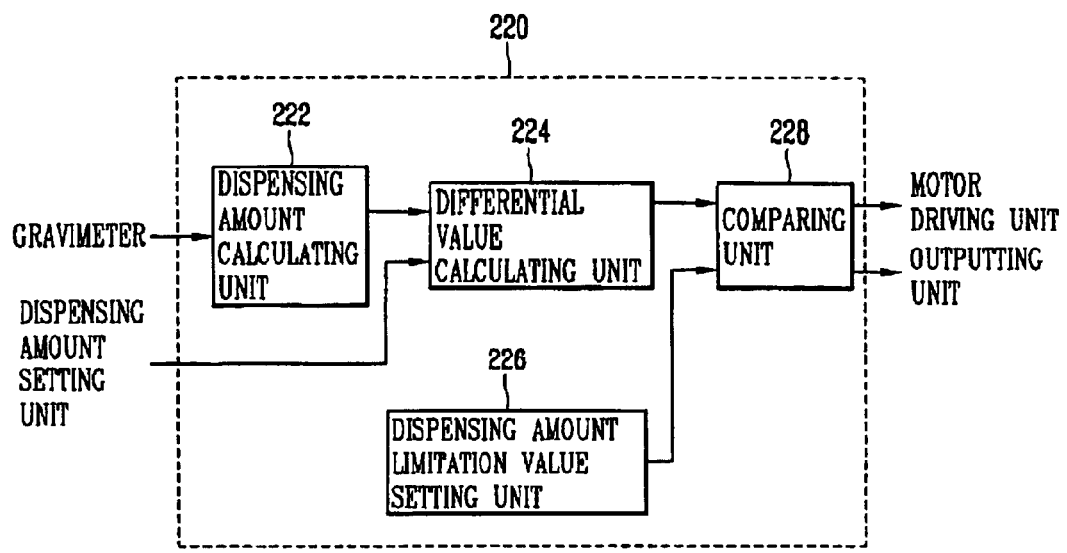
FIG. 14 is a block diagram of a dispensing amount compensating unit.

As shown in FIG. 14, the weight of liquid crystal measured by the gravimeter 129 is input to the dispensing amount compensating unit 220. Herein, necessary information to compensate the dispensing amount is not the weight itself measured by the gravimeter 129 but the difference between the previous dispensing weight of liquid crystal and the current dispensing weight of liquid crystal. A dispensing amount calculating unit 222 compares a measured value (the weight of liquid crystal) input real time from the gravimeter 129 with the previous dispensing weight to calculate the difference, thereby calculating a substantial dispensing weight of liquid crystal. Also, a density of liquid crystal being dispensed is stored in the dispensing amount calculating unit 222, so that the current dispensing amount of liquid crystal can be calculated based on the calculated substantial dispensing weight.

The substantial dispensing amount of liquid crystal calculated by the dispensing amount calculating unit 222 is input to a differential value calculating unit 224. The differential value calculating unit 224 calculates a differential value between the input substantial dispensing amount and the preset dispensing amount set by the dispensing amount setting unit 221, and inputs the value to a comparing unit 228.

To the comparing unit 228, a dispensing amount limitation value set by a dispensing amount limitation value setting unit 226 is input. The dispensing amount limitation value is a limitation value for a differential value between the set value of liquid crystal and the substantially measured value. Herein, the dispensing amount limitation value setting unit 226 can set one limitation value or a plurality of limitation values. The first limitation value and the second limitation value may be determined by a viscosity of liquid crystal, a size of the liquid crystal panel, and a dispensing pattern of liquid crystal.

When setting one limitation value, the set dispensing amount limitation value means an allowable value of a dispensing amount of liquid crystal dispensed onto the liquid crystal panel. That is, if liquid crystal is dispensed with an error within the limitation value, inferiority of the LCD device is not generated. On the contrary, when setting a plurality of limitation values, each setting value defines different values. For instance, in case of setting two limitation values, a first limitation value defines an allowable value of the liquid crystal dispensing and a second limitation value defines a threshold value that causes inferiority of the liquid crystal dispensing. That is, if the differential value between the measured dispensing amount and the preset dispensing amount of liquid crystal obtained by the comparing unit 228 is within the first limitation value, the inferiority of the LCD device is not generated by the liquid crystal dispensing, thereby continuously performing the current liquid crystal dispensing is continuously performed. However, if the differential value exceeds the first limitation value and is within the second limitation value, the difference between the differential value (the difference value between the preset dispensing amount and the substantially measured dispensing amount, a dispensing amount compensating value) and the first limitation value is outputted to the motor driving unit 230 as a driving signal, thereby compensating the dispensing amount of liquid crystal to be within the first limitation value. Also, when the differential value exceeds the second limitation value, the dispensing of liquid crystal is stopped and an alarm is transmitted to the user through the outputting unit 250.

A measured value is real time input to the dispensing amount calculating unit 222 from the gravimeter 129, and on the basis of the input information, the dispensing amount is real time compensated. According to this, effective compensation for the dispensing amount of liquid crystal is performed and thereby the inferiority of the LCD device can be prevented. The dispensing amount calculating unit 222 calculates a single dispensing amount, that is, a dispensing amount of one drop dispensed onto the substrate (i.e., one transfer event), a dispensing amount of a certain number of times (i.e., a plurality of transfer events), or a dispensing amount onto one unit panel or one substrate. The reason why the dispensing of a certain number of times is performed onto the substrate is because a single dispensing amount of liquid crystal is very minute as several mg. It may be difficult to precisely measure the single dispensing amount by comparing the entire weight of the liquid crystal material container 122 with the weight of the liquid crystal material container 122 from which the weight of the single dispensing amount is subtracted. Therefore, a dispensing of liquid crystal of a certain number of times (for example, 50 times or 100 times) is performed and a total dispensing weight is measured. Also, a dispensing amount of liquid crystal can be calculated by dispensing liquid crystal onto one unit panel or one substrate and then by measuring the dispensing weight. For the most precise dispensing of liquid crystal, it is desirable to calculate a single dispensing amount based on a single dispensing weight.

Figure 15:
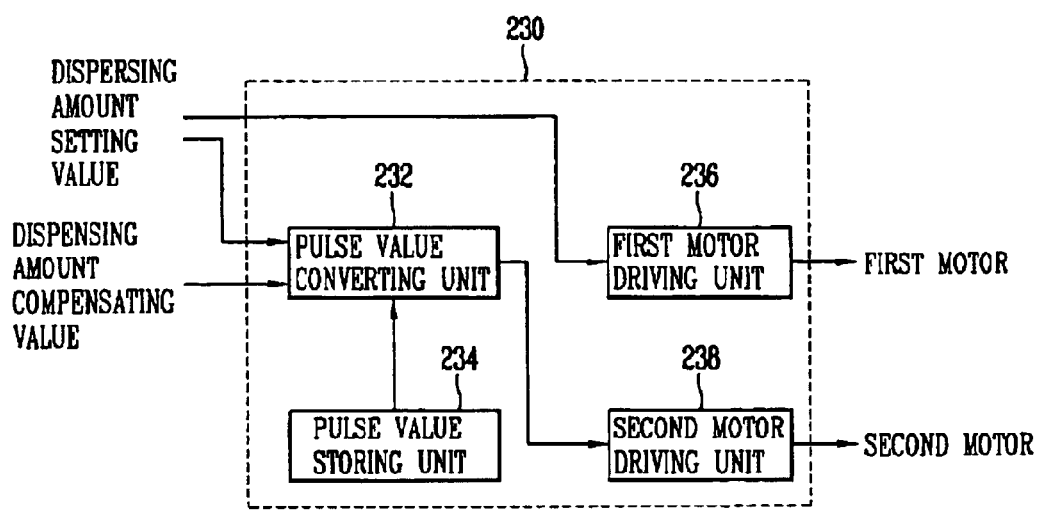
FIG. 15 is a block diagram of a motor driving unit.

In FIG. 15, the motor driving unit 230 includes: a pulse value storing unit 234 for storing pulse value information regarding a dispensing amount of liquid crystal in order to drive the first motor 131 and the second motor 133; a pulse value converting unit 232 for converting a single dispensing amount setting value input from the dispensing amount setting unit 210 and a dispensing amount compensating value input from the dispensing amount compensating unit 220 into a pulse value; a first motor driving unit 236 for outputting a driving signal accordingly as the single dispensing amount setting value is input and thereby driving the first motor 131 for operating the liquid crystal discharge pump 140; and a second motor driving unit 238 for outputting a driving signal for driving the second motor 133 accordingly as the pulse value converted by the pulse value converting unit 232 is input, and thereby varying a fixation angle of the liquid crystal discharge pump 140.

Rotation angle information of the second motor 133 regarding a pulse value is stored in the pulse value storing unit 234. Accordingly as a pulse value is input, the second motor 133 is rotated as much as a corresponding angle. Because the second motor 133 drives rotational shaft 136 and because the liquid crystal capacity amount controlling member 134 is engaged with the rotational shaft 136, rotational movement of the shaft 136 may be used to selectively move the controlling member 134. For instance, controlling member 134 may be engaged with rotational shaft 136 by mating threads such that rotational movement of the shaft 136 moves the controlling member 134 axially along the shaft 136. As previously described, motion of the liquid crystal capacity amount controlling member 134 adjusts the fixation angle of the liquid crystal discharge pump 140 to a fixing unit 149, and thereby varies or compensates the discharge amount of liquid crystal from the liquid crystal discharge pump 140.

As aforementioned, the second motor 133 may be a step motor which is rotated one time as approximately 1000 pulses are input. For example, the second motor 133 may be rotated approximately 0.36° for one pulse. In this manner, the rotation angle of the second motor 133 can be minutely controlled, and thus the discharge amount of the liquid crystal discharge pump 140 can be minutely controlled.

As aforementioned, the gravimeter 129 may be installed at the supporting unit 127 to real time measure a dispensing weight, such that real time checking (or monitoring) an amount of liquid crystal remaining in the liquid crystal material container 122 may be performed.

As aforementioned, monitoring the amount of liquid crystal may be useful for improving liquid crystal material transfer processes. For example, liquid crystal 107 contained in the liquid crystal material container 122 of the liquid crystal dispenser 120 may be insufficient for a particular transfer event. In another example, dispensing liquid crystal onto a substrate may involve dispensing liquid crystal onto the substrate of a preset number of sheets such that new liquid crystal 107 has to be added to the liquid crystal material container 122 to complete the transfer event. In another example, a preset dispensing amount of liquid crystal (or a target dispensing amount) may not be transferred onto a substrate. For instance, a minute variation in the amount of liquid crystal material transferred to the substrate may arise from an uncontrolled factor in the external environment. Minute variation of the dispensing amount that is undetected or uncompensated can produce a significant difference between the dispensing amount substantially dispensed onto the substrate and the preset dispensing amount. This may be of special concern for a transfer event involving many individual transfers of liquid crystal material. For example, if the substantial dispensing amount of liquid crystal is more than the preset dispensing amount, the liquid crystal contained in the liquid crystal material container 122 may be dispensed onto a last substrate, of a plurality of substrates, with less than the preset amount. Such an inferiority of liquid crystal may adversely effect black brightness of an LCD device of a normally black mode or white brightness of an LCD device of a normally white mode. Moreover, if the substantial dispensing amount is less than the preset dispensing amount, liquid crystal remaining in the liquid crystal material container 122 may be wasted if exposed to air when the container is re-filled with new liquid crystal. More specifically, unused liquid crystal in the container may react with a substance, for example moisture in the air, or some other contaminant and become unsuitable for use such that the unused liquid crystal must be discarded. In a situation where the amount of liquid crystal in the container is more than a preset dispensing amount, the liquid crystal is a useable amount. Discarding an useable amount of liquid crystal that unnecessarily has become contaminated or otherwise rendered unusable prevents fabrication costs from being reduced.

For these reasons, it may be preferable that a user certify the amount of liquid crystal remaining in the liquid crystal material container 122 to prevent expensive liquid crystal from becoming waste. A user, however, may be unable to certify the remaining amount of liquid crystal inside the liquid crystal material container 122 by direct visual inspection because the liquid crystal material container 122 of the liquid crystal dispenser 120 may include a case 124 formed of an opaque material (stainless steel) and a liquid crystal material container 122 formed of a material having a low transparency, such as polyethylene. A liquid crystal measuring device or sensor that measures the amount of liquid crystal material in the container, by contrast, may allow a user to certify the amount of liquid crystal material remaining in the container and prevent wasting of usable liquid crystal.

For example, a gravimeter 129 such as a load cell may be installed at the liquid crystal dispenser 120 to measure the weight of liquid crystal inside the liquid crystal material container 122 real time during liquid crystal dispensing. Control unit 200 may then check (or monitor) the remaining amount of liquid crystal based on a measured value input from the gravimeter 129. If the remaining amount of liquid crystal is less than the preset amount, the control unit 200 may then output a signal to the motor driving unit 230 to stop the driving of the first motor 131, thereby stopping liquid crystal dispensing.

Additionally, the gravimeter such as a load cell may be installed at the liquid crystal dispenser, and the current dispensing amount of liquid crystal may be calculated based on the weight of liquid crystal real time measured by the gravimeter (by subtracting the current weight of liquid crystal from the previous dispensing weight). The weight of liquid crystal may be real time measured to calculate a real time dispensing amount of liquid crystal. The dispensing amount of liquid crystal, however, may also be calculated by directly measuring the volume of liquid crystal, instead of measuring the weight of liquid crystal. That is, any suitable sensor or device may be used to measure the amount of liquid crystal material in the container provided the dispensing amount of liquid crystal can be real time calculated. For example, the dispensing amount of liquid crystal may be calculated by real time measuring the volume of liquid crystal by reach time analysis of an ultrasonic wave from an ultrasonic sensor inside the liquid crystal material container. In this case, the volume difference between the current measured volume of liquid crystal and the previous measured volume is the current dispensing amount. As described above, the dispensing amount of liquid crystal can be compensated based on the volume difference.

As aforementioned, the amount (e.g., weight or volume) of liquid crystal may be real time measured by a sensor such that the controller can real time calculate the current dispensing amount of liquid crystal. The current dispensing amount of liquid crystal may then be compared with a preset dispensing amount. If the difference between these values meets or exceeds a selected limit, an error is generated and the fixation angle of the liquid crystal discharge pump is adjusted by the controller to compensate for the error. Accordingly, the dispensing amount of liquid crystal is compensated in real time to prevent inferiority of liquid crystal material from being transferred to a substrate during the manufacture of an LCD device.

It will be apparent to those skilled in the art that various modifications and variations can be made in the liquid crystal dispensing system of the present invention without departing from the spirit or scope of the invention. Thus, it is intended that the present invention cover the modifications and variations of this invention provided they come within the scope of the appended claims and their equivalents.

What is claimed is:

1. A liquid crystal dispensing system comprising:
   a container for containing liquid crystal;
   a liquid crystal measuring sensor proximate the container;
   a discharge pump for pumping liquid crystal from the container, the discharge pump having a cylinder, a piston inserted into the cylinder, the piston having a longitudinal axis and a groove, the groove being located at a lower portion of the piston for pumping liquid crystal by rotational and axial movement, a case for housing the cylinder and the piston, and pump inlet and discharge openings for receiving and discharging liquid crystal, respectively, as the piston moves; and
   a nozzle in fluid communication with the pump discharge opening for dispensing liquid crystal discharged from the discharge pump onto a substrate.

2. The system of claim 1, further comprising a liquid crystal capacity amount controlling member contacting the discharge pump, for varying a fixation angle of the discharge pump and thereby controlling a discharge amount of liquid crystal.

3. The system of claim 1, wherein the liquid crystal measuring sensor includes a gravimeter for measuring a weight of liquid crystal in the container.

4. The system of claim 3, wherein the gravimeter includes a load cell.

5. The system of claim 1, wherein the liquid crystal measuring sensor includes a device that indicates a volume of liquid crystal in the container.

6. The system of claim 5, wherein the device is an ultrasonic sensor.

7. The system of claim 1, further comprising a control unit for controlling a discharge amount of liquid crystal discharged from the discharge pump and calculating and compensating a dispensing amount of liquid crystal based on an amount of liquid crystal in the container measured by the liquid crystal measuring sensor.

8. The system of claim 7, wherein the control unit includes:
   a dispensing amount setting unit for setting a selected dispensing amount of liquid crystal to be dropped onto the substrate;
   a dispensing amount compensating unit for calculating a current dispensing amount of liquid crystal based on the amount of liquid crystal measured by the liquid crystal measuring sensor, and calculating a differential value between the selected dispensing amount of liquid crystal set by the dispensing amount setting unit and the current dispensing amount;
   a motor driving unit for operating the liquid crystal discharge pump by driving a motor; and
   a substrate driving unit for driving the substrate and thereby aligning a dispensing position of liquid crystal with the nozzle.

9. The system of claim 8, wherein the dispensing amount compensating unit includes:
   a dispensing amount calculating unit for calculating the current dispensing amount of liquid crystal based on the amount of liquid crystal measured by the liquid crystal measuring sensor;

a differential value calculating unit for calculating the differential value between the current dispensing amount of liquid crystal measured by the dispensing amount calculating unit and the selected dispensing amount of liquid crystal;

a dispensing amount limitation value setting unit for setting a limitation value of the differential value calculated by the differential value calculator unit; and a comparing unit for comparing the differential value and the dispensing amount limitation value respectively input from the differential value calculating unit and the dispensing amount limitation value setting unit, and based on a comparison of the differential value and the dispensing amount limitation value outputting a signal to the motor driving unit.

10. The system of claim 9, wherein the dispensing amount calculating unit calculates the current dispensing amount of liquid crystal by subtracting a second amount of liquid crystal measured by the liquid crystal measuring sensor from a first amount of liquid crystal measured by the liquid crystal measuring sensor.

11. The system of claim 10, wherein the dispensing amount is a single transfer event.

12. The system of claim 10, wherein the dispensing amount is a dispensing amount with a preset number of transfer events.

13. The system of claim 10, wherein the dispensing amount is a dispensing amount corresponding to a unit panel.

14. The system of claim 10, wherein the dispensing amount is a dispensing amount corresponding to a substrate.

15. The system of claim 9, wherein if the limitation value exceeds the dispensing amount differential value, a signal is outputted to the motor so as to compensate the dispensing amount.

16. The system of claim 9, wherein if the limitation value exceeds the dispensing amount differential value, a signal is outputted to the motor thus to stop the liquid crystal dispensing.

17. The system of claim 8, wherein the control unit checks a remaining amount of liquid crystal inside the liquid crystal material container based on a measured value input from the liquid crystal measuring sensor.

18. The system of claim 17, wherein if the remaining amount of liquid crystal is less than the selected dispensing amount of liquid crystal, the motor driving unit stops the operation of the motor thereby stopping liquid crystal dispensing.

19. The system of claim 18, wherein the selected amount of liquid crystal is an amount of liquid crystal dispensed onto one substrate.

20. The system of claim 8, wherein the motor driving unit is composed of:

a pulse value storing unit for storing pulse value information regarding a dispensing amount of liquid crystal; and a pulse value converting unit for converting a dispensing amount compensating value into a pulse value for outputting to the motor based on pulse value information stored in the pulse value storing unit and the dispensing amount limitation value input from the dispensing amount compensating unit.

21. A liquid crystal dispensing system comprising:
a container for containing liquid crystal;
means for measuring an amount of liquid crystal contained in the container;

a discharge pump for pumping liquid crystal from the container, the discharge pump having a cylinder, a piston inserted into the cylinder, the piston having a longitudinal axis and a groove, the groove being located at a lower portion of the piston for pumping liquid crystal by rotational and axial movement, a case for housing the cylinder and the piston, and pump inlet and discharge openings for receiving and discharging liquid crystal, respectively, as the piston moves; and a nozzle in fluid communication with the pump discharge opening for dispensing liquid crystal discharged from the discharge pump onto a substrate.

22. An apparatus for supplying liquid crystal material comprising:

a container for storing liquid crystal material;

a drive member;

a pump for transferring liquid crystal material from the container, the pump including:

a member having at least two outer surfaces and a recess extending from one outer surface toward an interior of the member, the recess being defined by at least two inner surfaces, and first and second bores extending from the at least one other outer surface to the recess, the first bore for receiving liquid crystal material and the second bore for discharging liquid crystal material from the pump, the first bore being in fluid communication with the container, and a piston for transferring liquid crystal material from the first bore to the second bore, the piston having a longitudinal axis and proximal and distal ends, the proximal end connected to the drive member and the distal end received in the recess such that movement of the drive member moves the piston in the recess for transferring liquid crystal material in the first bore to the second bore; and a metering system for regulating the transfer of liquid crystal material from the container, the metering system having a sensor for measuring liquid crystal material in the container and a controller for regulating liquid crystal material transfer by the pump.

23. The apparatus of claim 22, wherein the drive member moves the piston relative to the recess in a direction substantially parallel to the longitudinal axis of the piston such that the piston and the at least two inner surfaces define a space for drawing liquid crystal material from the first bore.

24. The apparatus of claim 23, wherein the drive member rotates the piston.

25. The apparatus of claim 24, wherein one rotation of the piston about the longitudinal axis comprises a plurality of strokes for pushing liquid crystal material from the first bore to the second bore.

26. The apparatus of claim 25, wherein rotational movement of the piston is driven by a first motor connected to the drive member and controller by the controller.

27. The apparatus of claim 25, wherein the piston includes a structure for pushing liquid crystal material from the first bore to the second bore.

28. The apparatus of claim 27, wherein the structure includes a groove, the groove having an area corresponding to at least about one-quarter of a sectional area of the distal end of the piston.

29. The apparatus of claim 22, wherein the controller includes one or more control units which set a target dispensing amount of liquid crystal material, calculate a measured dispensing amount of liquid crystal material being discharged during a transfer event based on at least two values measured by the sensor, and that compensate a differential value dispensing amount by adjusting the piston relative to the member to effect a change in liquid crystal material discharge from the second bore.

30. The apparatus of claim 22, wherein the controller includes one or more control units which set a target dispensing amount of liquid crystal material for a selected discharge event, calculate a remaining amount of liquid crystal material in the container based on a value measured by the sensor, and that stop the pump if the remaining amount of liquid crystal material in the container is less than the target dispensing amount of liquid crystal material for the selected discharge event.

31. The apparatus of claim 22, wherein the sensor for measuring liquid crystal material in the container comprises a gravimeter.

32. The apparatus of claim 31, wherein the sensor for measuring liquid crystal material in the container is a load cell for measuring weight.

33. The apparatus of claim 22, wherein the sensor for measuring liquid crystal material in the container comprises an ultrasonic sensor for measuring volume.

34. An apparatus for placing liquid crystal material on a substrate comprising:
a container for storing liquid crystal material;
a drive member;
a pump for transferring liquid crystal material from the container, the pump including:
a member having at least two outer surfaces and a recess extending from one outer surface toward an interior of the member, the recess being defined by at least two inner surfaces, and first and second bores extending from the at least one other outer surface to the recess, the first bore for receiving liquid crystal material and the second bore for discharging liquid crystal material from the pump, the first bore being in fluid communication with the container, and
a piston for transferring liquid crystal material from the first bore to the second bore, the piston having a longitudinal axis and proximal and distal ends, the proximal end connected to the drive member and the distal end received in the recess such that movement of the drive member moves the piston in the recess for transferring liquid crystal material in the first bore to the second bore; and
a metering system for regulating the transfer of liquid crystal material from the container, the metering system having a sensor for measuring liquid crystal material in the container and a controller for regulating liquid crystal material transfer by the pump,
wherein the drive member has a central axis, and the proximal end of the piston is secured to the drive member at an attachment site such that the longitudinal axis of the piston and the central axis of the drive member intersect to form a fixation angle for controlling relative movement between the piston and recess such that the fixation angle regulates pump discharge capacity.

35. The apparatus of claim 34, wherein the fixation angle is variable.

36. The apparatus of claim 35, wherein the fixation angle is selectable by a controlling member having first and second ends, the first end of the controlling member being secured to a longitudinal member spaced from the pump, and the second end of the controlling member contacts the pump to set the fixation angle.

37. The apparatus of claim 36, wherein the first end of the controlling member is selectively movable along the longitudinal member such that moving the first end of the controlling member changes the fixation angle.

38. The apparatus of claim 37, wherein moving the controlling member in one direction along the longitudinal member increases fixation angle.

39. The apparatus of claim 36, wherein the first end of the controlling member has a first structure and the longitudinal member has a mating structure to selectively move the controlling member relative to the longitudinal member.

40. The apparatus of claim 39, wherein the first structure is a threaded bore and the second structure is a screw thread such that rotational movement of the longitudinal member in the threaded bore moves the controlling member.

41. The apparatus of claim 40, wherein rotational movement of the longitudinal member is driven by a second motor which is controller by the controller.

42. The apparatus of claim 41, wherein second motor receives control signals from the controller wirelessly.

43. The apparatus of claim 40, wherein rotational movement of the longitudinal member is driven by a knob.

44. The apparatus of claim 39, wherein the fixation angle is measured by a fixation angle measuring sensor.

45. The apparatus of claim 44, wherein the fixation angle measuring sensor comprises a linear variable differential transformer, and the controller stops movement of the controlling member relative if an allowable fixation angle is exceeded.

46. The apparatus of claim 45, wherein the allowable fixation angle is preset.

47. The apparatus of claim 1, further comprising a nozzle in fluid communication with the second bore for dispensing liquid crystal material to the substrate.

48. The apparatus of claim 47, wherein the metering system further comprises a second sensor proximate the nozzle for detecting vapor in liquid crystal material discharge from the nozzle.

49. The apparatus of claim 48, wherein the second sensor monitors liquid crystal material in a transparent conduit that supplies liquid crystal material to the nozzle.

50. The apparatus of claim 48, wherein the metering system further comprises a third sensor adjacent the nozzle for detecting liquid crystal material build-up on the nozzle.

51. The apparatus of claim 47, wherein the nozzle is spaced from the substrate.

52. The apparatus of claim 51, wherein the nozzle is located vertically above the substrate.

53. The apparatus of claim 52, wherein the substrate is movable relative to the nozzle.

54. The apparatus of claim 53, wherein the substrate moves at a predetermined speed.

55. The apparatus of claim 54, wherein the substrate moves at a predetermined trajectory.

56. The apparatus of claim 55, wherein the substrate is a thin film transistor.

57. The apparatus of claim 55, wherein the substrate is a color filter substrate.

58. The apparatus of claim 55, wherein the substrate comprises a transparent material.

59. The apparatus of claim 55, wherein the substrate comprises glass.

60. A method of fabricating an LCD device using the system of claim 1 comprising:
placing liquid crystal material on a substrate with the apparatus;
applying a sealant on the substrate; and joining a second substrate to the first substrate using the sealant.

61. A method of fabricating an LCD device using the system of claim 21 comprising:

placing liquid crystal material on a substrate with the apparatus;

applying a sealant on the substrate; and joining a second substrate to the first substrate using the sealant.

62. A method of fabricating an LCD device using the apparatus of claim 22 comprising:

placing liquid crystal material on a substrate with the apparatus;

applying a sealant on the substrate; and joining a second substrate to the first substrate using the sealant.

63. A method of fabricating an LCD device using the apparatus of claim 34 comprising:

placing liquid crystal material on a substrate with the apparatus;

applying a sealant on the substrate; and joining a second substrate to the first substrate using the sealant.

64. A method of dispensing liquid crystal material comprising:

providing a variable discharge pump having a discharge nozzle and an adjustable discharge rate;

supplying the pump with a supply of liquid crystal material;

positioning a first substrate proximate the nozzle;

setting a target dispensing amount of liquid crystal material for the first substrate;

setting a first liquid crystal material dispensing amount limitation value;

pumping liquid crystal material from the supply to the nozzle;

measuring a first amount of liquid crystal material in the supply;

transferring liquid crystal material from the nozzle to the first substrate;

measuring a second amount of liquid crystal material remaining in the supply;

calculating a substantial dispensing amount of liquid crystal material transferred from the nozzle to the substrate, the substantial dispensing amount of liquid crystal material transferred from the nozzle to the first substrate being equal to the first amount of liquid crystal in the supply minus the second amount of liquid crystal material remaining in the supply;

calculating a differential value equal to the substantial dispensing amount of liquid crystal material minus the target dispensing amount of liquid crystal material;

performing one or more actions based on a comparison of the differential value to the first liquid crystal material dispensing amount limitation value, the one or more actions performed including increasing discharge of the pump, if the differential value is greater than the first dispensing amount limitation.

65. The method of claim 64, further comprising increasing discharge of the pump, if the differential value is greater than or equal to the first dispensing amount limitation value and less than the second dispensing amount limitation value.

66. The method of claim 65, further comprising stopping discharge of the pump, if the differential value is greater than the second dispensing amount limitation value.

67. The method of claim 66, further comprising stopping discharge of the pump, if the differential value is greater than or equal to the second dispensing amount limitation value.

68. The method of claim 64, further comprising stopping discharge of the pump, if the target dispensing amount of liquid crystal material for the first substrate is less than the second amount of liquid crystal material remaining in the supply.

69. The method of claim 68, further comprising stopping discharge of the pump, if the target dispensing amount of liquid crystal material for the first substrate is less than or equal to the second amount of liquid crystal material remaining in the supply.

70. The method of claim 69, wherein the amount of liquid crystal material is measured by weight.

71. The method of claim 69, wherein the amount of liquid crystal material is measured by volume.

72. A method of fabricating an LCD device comprising:

performing the method of claim 60;

applying a sealant on the first substrate;

pressing a second substrate to the sealant; and spreading liquid crystal material between the first and second substrates.

73. The method of claim 72, further comprising forming a color filter layer on the first substrate.

74. The method of claim 72, further comprising forming a TFT on the second substrate.

* * * * *